(12) United States Patent
Watanabe

(10) Patent No.: US 9,402,210 B2
(45) Date of Patent: Jul. 26, 2016

(54) WIRELESS COMMUNICATION SYSTEM, WIRELESS COMMUNICATION METHOD, WIRELESS BASE STATION, AND WIRELESS COMMUNICATION TERMINAL

(71) Applicant: FUJITSU LIMITED, Kawasaki-shi, Kanagawa (JP)

(72) Inventor: Naotoshi Watanabe, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 25 days.

(21) Appl. No.: 13/916,032

(22) Filed: Jun. 12, 2013

(65) Prior Publication Data

US 2013/0273918 A1 Oct. 17, 2013

Related U.S. Application Data

(63) Continuation of application No. PCT/JP2010/073047, filed on Dec. 21, 2010.

(51) Int. Cl.
*H04W 36/00* (2009.01)

(52) U.S. Cl.
CPC ...... *H04W 36/0011* (2013.01); *H04W 36/0055* (2013.01); *H04W 36/0061* (2013.01)

(58) Field of Classification Search
CPC . H04W 36/00; H04W 36/0005; H04W 36/06; H04W 36/08; H04W 36/165; H04W 36/18; H04W 36/0011; H04W 36/0055; H04W 36/0061
USPC ......... 455/436, 437, 438, 439, 442, 443, 444; 370/331, 332
See application file for complete search history.

(56) References Cited

U.S. PATENT DOCUMENTS

2007/0021151 A1* 1/2007 Mori et al. ................. 455/562.1
2009/0046578 A1 2/2009 Aydin et al.
(Continued)

FOREIGN PATENT DOCUMENTS

EP 2 244 502 A1 10/2010
JP 2010-506506 A 2/2010
(Continued)

OTHER PUBLICATIONS

3GPP TS 23.401 V9.5.0 (Jun. 2010), "GPRS enhancements for E-UTRAN access", Sec5.3.4, Jun. 2010.
(Continued)

*Primary Examiner* — Thai Vu
(74) *Attorney, Agent, or Firm* — Arent Fox LLP

(57) ABSTRACT

A target cell extracting unit extracts a handover destination cell of a wireless communication terminal. A target cell notifying unit notifies first HO preparation information, which is information for handover of the wireless communication terminal including information about the handover destination cell, to an eNB accommodating the handover destination cell. A subsequent candidate cell notifying unit receives, from the eNB, information about a subsequent candidate cell, and notifying second HO preparation information including the information about the subsequent candidate cell to the eNB. A subsequent candidate cell extracting unit obtains the information about the handover destination cell from the received first HO preparation information, and extracts the subsequent candidate cell based on a state between the handover destination cell and another cell in wireless communication. A subsequent candidate cell notifying unit notifies the information about the subsequent candidate cell to the eNB.

7 Claims, 13 Drawing Sheets

(56) References Cited

U.S. PATENT DOCUMENTS

2010/0069064 A1* 3/2010 Hannu et al. ............... 455/434
2010/0178920 A1 7/2010 Kitazoe et al.
2010/0278097 A1* 11/2010 Li et al. ..................... 370/315

FOREIGN PATENT DOCUMENTS

| JP | 2010-536289 A | 11/2010 | | |
|----|----|----|----|----|
| WO | WO 2008/042906 A2 | 4/2008 | | |
| WO | WO 2009/021614 A1 | 2/2009 | | |
| WO | WO 2010/121885 A1 * | 10/2010 | ............ | H04W 36/08 |
| WO | WO 2011/000154 A1 * | 1/2011 | ............ | H04W 16/00 |
| WO | WO 2011/002115 A1 * | 1/2011 | ............ | H04W 72/04 |

OTHER PUBLICATIONS

3GPP TS 36.300 V10.0.0 (Jun. 2010) "E-UTRA and E-UTRAN; Overall description; Stage 2", Sec10.1.6, Jun. 2010.
3GPP TS 36.331 V9.0.0 (Sep. 2009) "E-UTRA RRC; Protocol specification", Sec5.3.7, Sep. 2009.
PCT/JP2010/073047 International Search Report PCT/ISA/220 mailed Mar. 22, 2011.
Huawei, "Mobility Robustness Optimisation", 3GPP TSG RAN WG3 Meeting #59, R3-080754, XP050163962, Shenzhen, China, Mar. 31-Apr. 3, 2008.
Extended European Search Report of European Patent Application 10860945.4 dated Feb. 25, 2016.

* cited by examiner

WIRELESS COMMUNICATION SYSTEM, WIRELESS COMMUNICATION METHOD, WIRELESS BASE STATION, AND WIRELESS COMMUNICATION TERMINAL

CROSS-REFERENCE TO RELATED APPLICATION

This application is continuation application of International Application PCT/JP2010/073047 filed on Dec. 21, 2010 and designating the U.S., the entire contents of which are incorporated herein by reference.

FIELD

The present invention relates to a wireless communication system, a wireless communication method, a wireless base station, and a wireless communication terminal.

BACKGROUND

3GPP (3rd Generation Partnership Project), a standardization organization for third generation mobile communication system, is studying wireless access network for next generation mobile communication system. This wireless access network is called E-UTRAN (Evolved Universal Terrestrial Radio Access Network) or LTE (Long Term Evolution).

The LTE defines reconnection procedure for radio link failure (RLF: Radio Link Failure) that occurs between a wireless communication terminal and Serving eNB (evolved Node B), i.e., a destination wireless base station. By following this defined reconnection procedure, it is not requested to initialize the communication state with the wireless access network and execute initial access connection procedure again, and this reduces the interruption time of a service used by the wireless communication terminal when RLF occurs.

Even when a wireless communication terminal moves to a cell edge where it is difficult to maintain the radio quality, the wireless access network executes handover in order to continue to provide a service with a certain level of quality without reminding the operator of the wireless communication terminal of the movement of the wireless communication terminal. More specifically, the wireless communication terminal notifies the eNB of a Measurement Report including a measured radio quality. Then, the eNB determines whether or not handover is to be executed for the wireless communication terminal that has transmitted the Measurement Report on the basis of the received radio quality. Then, to perform the handover, the Serving eNB connected to the wireless communication terminal executes an HO Preparation procedure, and distributes and sets, in advance, information about handover to a handover target cell and to, in some cases, cells that may be reconnected in accordance with operation condition. The information about the handover is UE context which is information used for reception of connection and reconnection due to handover by the eNB having a handover destination (or reconnection destination) cell, and unless the UE context is obtained, reconnection is not accepted.

Non-patent literature 1 3GPP TS 36.300 V10.0.0 (2010 June), "E-UTRA and E-UTRAN; Overall description; Stage 2", Sec10.1.6

Non-patent literature 2 3GPP TS 36.331 V9.0.0 (2009 September), "E-UTRA RRC; Protocol specification", Sec5.3.7

Non-patent literature 3 3GPP TS 23.401 V9.5.0 (2010 June), "GPRS enhancements for E-UTRAN access", Sec5.3.4

SUMMARY

However, in actual communication, when a wireless communication terminal meets radio link failure (RLF) during handover process or after the handover because of change of the communication state, it may try to reconnect to a cell different from a cell which has setting of the information about the handover, i.e. the handover destination cell. In such a case, with the conventional technique, it may fail to make reconnection, because a cell to which reconnection is to be actually made does not have setting of the information used for reception of reconnection.

A wireless communication system includes a plurality of wireless base stations. A first wireless base station, connected to a wireless communication terminal, includes a target cell extracting unit that extracts a handover destination cell of the wireless communication terminal; a target cell notifying unit that notifies first HO preparation information, which is information for handover of the wireless communication terminal including information about the handover destination cell, to a second wireless base station accommodating the handover destination cell; and a subsequent candidate cell notifying unit that receives, from the second wireless base station, information about a subsequent candidate cell which is a candidate of handover destination other than the handover destination cell, and notifies second HO preparation information including the information about the subsequent candidate cell to a wireless base station accommodating the subsequent candidate cell. The second wireless base station includes a subsequent candidate cell extracting unit that obtains the information about the handover destination cell from the received first HO preparation information, and extracts the subsequent candidate cell based on a state between the handover destination cell and another cell in wireless communication; and a subsequent candidate cell notifying unit that notifies the subsequent candidate cell to the first wireless base station.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT

Hereinafter, embodiments of a wireless communication system, a wireless communication method, a wireless base station, and a wireless communication terminal disclosed by the present application will be explained in detail with reference to drawings. Incidentally, the wireless communication system, the wireless communication method, the wireless base station, and the wireless communication terminal according to the present invention are not limited to the embodiments described below.

First Embodiment

Figure 1:
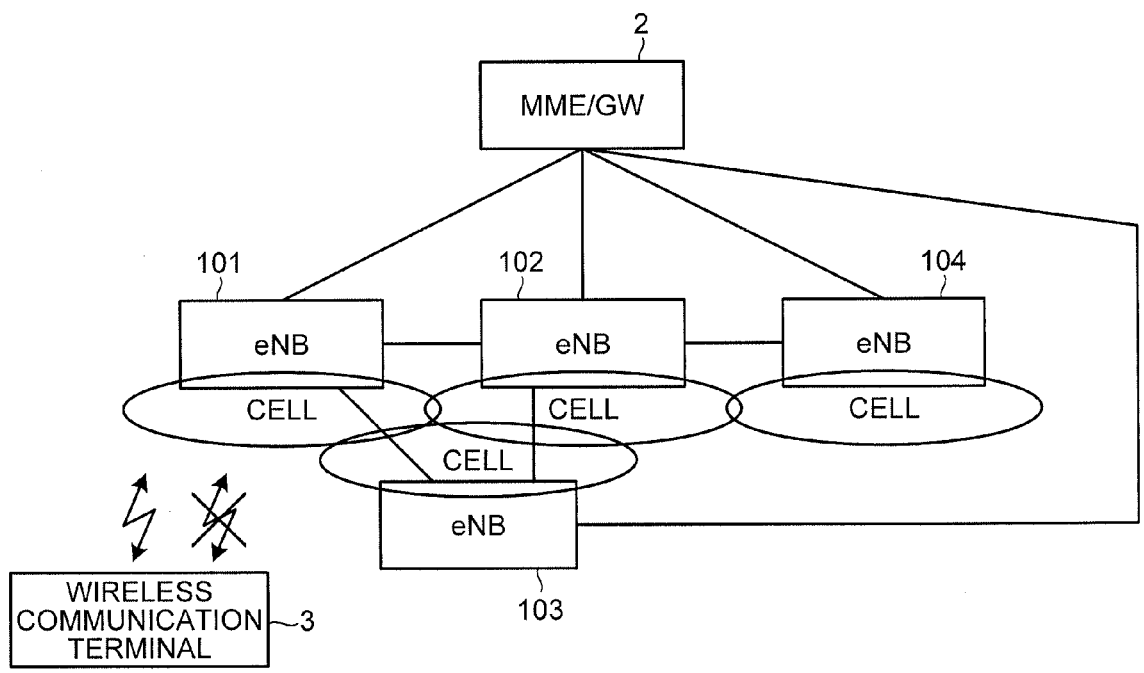
FIG. 1 is a figure illustrating an example of overall configuration of a wireless communication system.

FIG. 1 is a figure illustrating an example of overall configuration of a wireless communication system according to the first embodiment. The wireless communication system according to the present embodiment includes multiple eNBs (wireless base stations) 101 to 104 as illustrated in FIG. 1. In this case, FIG. 1 illustrates four wireless base stations, i.e., eNBs 101 to 104, but actually the number of wireless base stations is not particularly limited as long as there are multiple wireless base stations. Further, the wireless communication system according to the present embodiment includes an MME (Mobility Management Entity)/GW (Gateway) 2 and a wireless communication terminal 3.

The MME/GW 2 executes NAS security function, call control, handover path control. The eNBs 101 to 104 communicate with each other via a core network including the MME/GW 2. The eNB 101 and the eNB 102, the eNB 101 and the eNB 103, the eNB 102 and the eNB 103, and the eNB 102 and the eNB 104 are in adjacent relationship explained later, and exchange control information with each other without relying on the MME/GW 2.

Each of the eNBs 101 to 104 accommodates multiple cells. In this case, "accommodating a cell" means that the cell in question is managed by the wireless base station, and using the cell, connection can be made with the wireless base station accommodating the cell. In FIG. 1, for the sake of explanation, only one cell is described, but actually, each of the eNBs 101 to 104 accommodates multiple cells.

The wireless communication terminal 3 uses one of the cells accommodated by any one of the eNBs 101 to 104 by means of wireless communication to connect to any one of the eNBs 101 to 104 that accommodates the cell. Then, the wireless communication terminal 3 communicates with another wireless communication terminal (not illustrated) and the like via a core network. FIG. 1 illustrates a state in which the wireless communication terminal 3 connects to the eNB 101 and a state where radio link failure (RLF) occurs.

Then, when RLF occurs in the wireless connection currently connected, the wireless communication terminal 3 executes reconnection explained later in detail, and uses another cell to continue to communicate upon making reconnection to any one of the eNBs 101 to 104. In the explanation below, RLF occurs in the wireless communication terminal 3 that was connected to the eNB 101 using the eNB 101, and the eNB 101 extracts a cell under the eNB 102 as a handover destination cell. In this case, "extracting a handover destination cell" means that although handover is not yet made with the cell in question, the cell in question has been extracted as a target to which UE context is to be transmitted as a preparation of handover. In the explanation below, the handover destination cell extracted by the eNB 101 will be referred to as "target cell".

Figure 2:
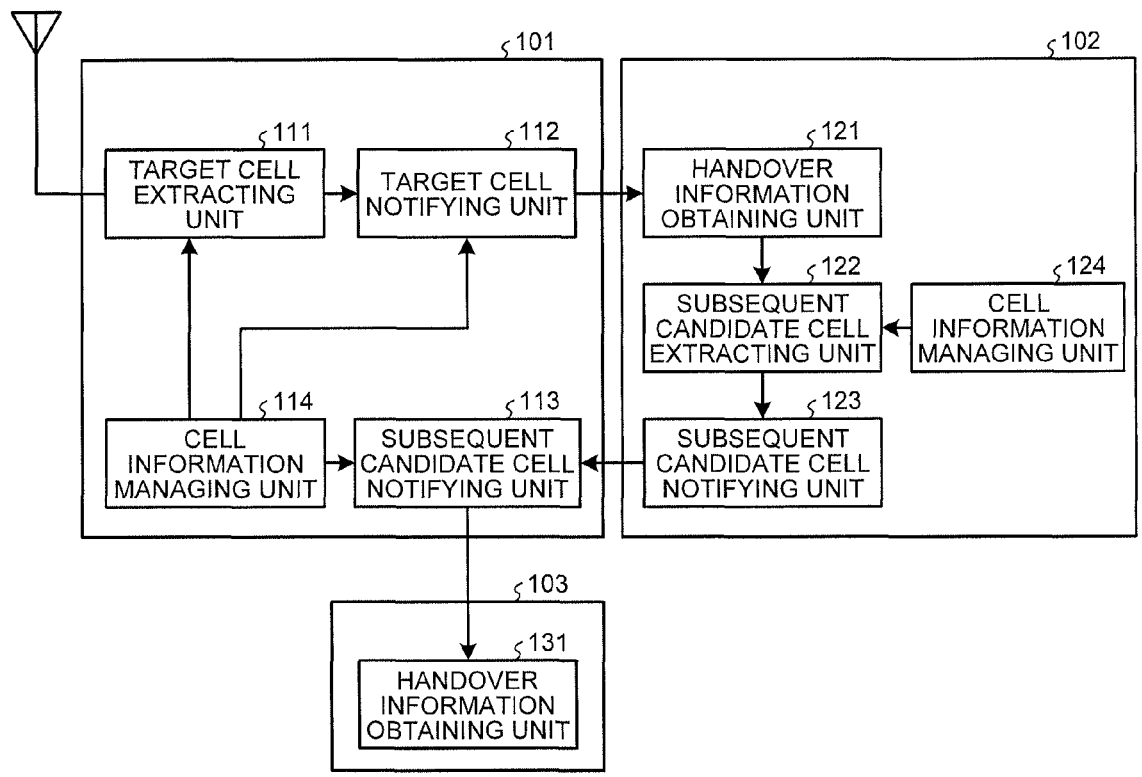
FIG. 2 is a block diagram illustrating wireless base stations according to a first embodiment.

FIG. 2 is a block diagram illustrating each wireless base station according to the first embodiment. FIG. 2 illustrates the functions of each of the eNBs 101 to 104 used for the explanation below. In reality, however, all of the eNBs 101 to 104 have the same configuration.

As illustrated in FIG. 2, the eNB 101 includes target cell extracting unit 111, a target cell notifying unit 112, a subsequent candidate cell notifying unit 113, and a cell information managing unit 114.

The target cell extracting unit 111 stores, in advance, a threshold value of communication quality for determining whether handover is possible or not and a threshold value of communication quality for extracting a target cell.

The target cell extracting unit 111 receives, from the wireless communication terminal 3, Measurement Report including the radio quality of communication currently performed which is measured by the wireless communication terminal 3. For example, the wireless communication terminal 3 stores, in advance, the threshold value of the communication quality for determining whether handover is possible or not, and when the communication quality decreases and becomes less than the threshold value, the Measurement Report is transmitted to the eNB 101. Then, the target cell extracting unit 111 determines whether handover is possible or not. More specifically, the target cell extracting unit 111 determines that the handover is possible when there is another cell of which communication quality for the use of the another cell is more than the threshold value determined in advance. Then, when the handover is possible, the target cell extracting unit 111 extracts the target. More specifically, the target cell extracting unit 111 extracts, as target cell, one of other cells of which communication quality is equal to or more than the threshold value for extraction of the target cell stored.

The target cell extracting unit 111 outputs information about the target cell to the target cell notifying unit 112.

The cell information managing unit 114 stores a cell information table expressing cells accommodated by the apparatus in question and adjacent relationship between these cells and cells accommodated by other base stations. In this case, the adjacent relationship indicates whether the wireless base station has a control connection with any given cell. Hereinafter, a cell with which the wireless base station has a control connection may be referred to as an "adjacent cell". The cell information table includes the identification information about each cell, information about the wireless base station accommodating each cell, and the like. The cell information managing unit 114 uses information obtained by control signaling from the core network and each wireless communication terminal to update and manage the stored cell information table. In this case, the method for updating the cell information table in the cell information managing unit 114 may be other methods. For example, it may receive input of adjacent relationship between accommodated cells and cells accommodated in other base stations from the wireless access network management system and update the cell information table on the basis of the received information.

The target cell notifying unit 112 receives input of information about the target cell from the target cell extracting unit 111. Then, the target cell notifying unit 112 looks up the cell information table managed by the cell information managing unit 114, and identifies a wireless base station accommodating the target cell. In the present embodiment, the target cell notifying unit 112 determines that the wireless base station accommodating the target cell is the eNB 102.

The target cell notifying unit 112 transmits the HO Request including the identification information about the target cell and the UE context which is information used for reception of handover and reconnection to the eNB 102. This HO Request corresponds to an example of "first HO preparation information".

The subsequent candidate cell notifying unit 113 receives notification of the HO Request Acknowledge including information about the subsequent candidate cell from a subsequent candidate cell notifying unit 123 of the eNB 102 explained later. Then, the subsequent candidate cell notifying unit 113 looks up the cell information table managed by the cell information managing unit 114 to identify the wireless base station accommodating a subsequent candidate cell. In the present embodiment, the subsequent candidate cell notifying unit 113 determines that the wireless base station accommodating the subsequent candidate cell is the eNB 103.

The subsequent candidate cell notifying unit 113 transmits the HO Request including the identification information about the target cell and the UE context to the eNB 103. This HO Request corresponds to an example of "second HO preparation information". In this case, in the present embodiment, when the subsequent candidate cell has no control connection with the apparatus in question (i.e., it is not an adjacent cell), it is difficult for the subsequent candidate cell notifying unit 113 to find the subsequent candidate cell, and therefore, does not perform processing to add the subsequent candidate cell to the target cell for handover preparation. In this case, the eNB 103 is the base station accommodating the subsequent candidate cell, but the eNB 102 itself extracting the subsequent candidate cell may be a base station accommodating the subsequent candidate cell. In this case, the subsequent candidate cell notifying unit 113 transmits the HO Request including the identification information about the target cell and the UE context to the eNB 102.

Subsequently, the eNB 102 will be explained. The eNB 102 includes a handover information obtaining unit 121, a subsequent candidate cell extracting unit 122, a subsequent candidate cell notifying unit 123, and a cell information managing unit 124.

The handover information obtaining unit 121 receives, from the target cell notifying unit 112 of the eNB 101, the HO Request including the identification information about the target cell and the UE context. The handover information obtaining unit 121 sets, in the target cell specified by the HO Request, setting of preparation of handover using the UE context.

Then, the handover information obtaining unit 121 outputs the identification information about the target cell to the subsequent candidate cell extracting unit 122.

The cell information managing unit 124 stores a cell information table expressing cells accommodated by the apparatus in question and adjacent relationship between these cells and cells accommodated by other base stations. The cell information table includes the identification information about the each cell, information about the wireless base station accommodating each cell, and the like. The cell information managing unit 124 uses information obtained by control signaling from the core network and each wireless communication terminal to update and manage the stored cell information table. In this case, the method for updating the cell information table in the cell information managing unit 124 may be other methods. For example, it may receive input of adjacent relationship between accommodated cells and cells accommodated in other base stations from the wireless access network management system and update the cell information table on the basis of the received information.

The subsequent candidate cell extracting unit 122 stores, in advance, a predetermined value as a threshold value of RLF incidence rate. The subsequent candidate cell extracting unit 122 also stores a predetermined number as an upper limit value of the number of times of reconnection occurrence. Further, the subsequent candidate cell extracting unit 122 stores a predetermined upper limit value of the number of subsequent candidate cells selected.

The subsequent candidate cell extracting unit 122 receives input of the identification information about the target cell specified by the eNB 101 from the handover information obtaining unit 121. Then, the subsequent candidate cell extracting unit 122 determines whether the RLF incidence rate of the target cell is equal to or more than the stored predetermined value. Then, when it is equal to or more than the predetermined value, the subsequent candidate cell extracting unit 122 looks up the cell information table stored in the cell information managing unit 124 to obtain the adjacent cell of the target cell. Then, the subsequent candidate cell extracting unit 122 extracts adjacent cells receiving reconnection from the target cell, of which the number of time of reconnections is equal to or more than the predetermined number stored.

Then, the subsequent candidate cell extracting unit 122 extracts, as subsequent candidate cell, a predetermined number of cells from the extracted cells in the descending order of the number of time of reconnections. However, when the number of adjacent cells of which number of time of reconnections is equal to or more than the predetermined number is less than a predetermined number, then the subsequent candidate cell extracting unit 122 extracts all the cells as the subsequent candidate cells. In this case, in the present embodiment, an upper limit value of the number of subsequent candidate cells is set in order to alleviate the load of processing during handover. However, when the load of processing can be somewhat tolerated, e.g., the processing performance of the wireless base station is high, then all the adjacent cells of which number of time of reconnections is equal to or more than the predetermined number may be adopted as the subsequent candidate cells.

The subsequent candidate cell extracting unit 122 outputs information about the extracted subsequent candidate cells to the subsequent candidate cell notifying unit 123.

The subsequent candidate cell notifying unit 123 notifies the information about the subsequent candidate cell received from the subsequent candidate cell extracting unit 122 to the subsequent candidate cell notifying unit 113 of the eNB 101. More specifically, the subsequent candidate cell notifying unit 123 uses the HO Request Acknowledge which is confirmation response of reception of the HO Request to notify the information about the subsequent candidate cell to the subsequent candidate cell notifying unit 113 of the eNB 101.

Figure 3:
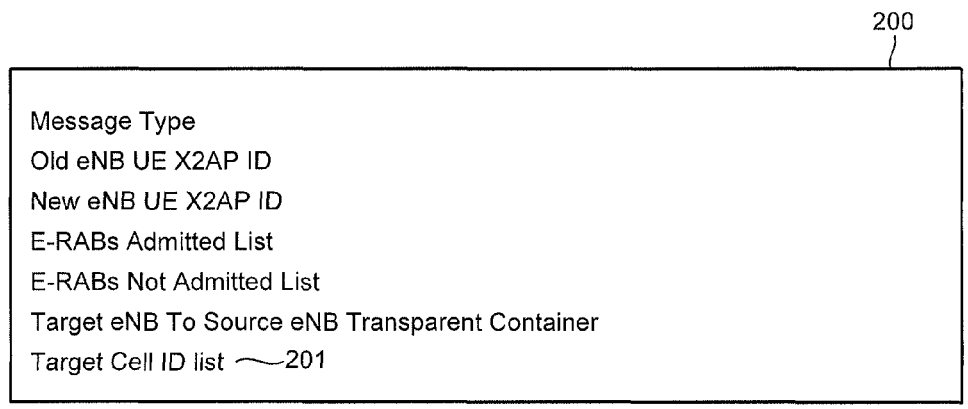
FIG. 3 is a figure illustrating an example of format of HO Request Acknowledge.

FIG. 3 is a figure illustrating an example of format of HO Request Acknowledge. As illustrated in FIG. 3, a format 200 of HO Request Acknowledge according to the present embodiment has an item of Target Cell ID list 201 in addition to a conventional format. The subsequent candidate cell notifying unit 123 describes information about the subsequent candidate cell in the Target Cell ID list 201. Then, the subsequent candidate cell notifying unit 123 transmits the HO Request Acknowledge describing the information about the subsequent candidate cell to the eNB 101, thus notifying the information about the subsequent candidate cell to the subsequent candidate cell notifying unit 113.

Subsequently, the eNB 103 will be explained. The eNB 103 includes a handover information obtaining unit 131.

The handover information obtaining unit 131 receives the HO Request including the UE context and the information about the subsequent candidate cell from the subsequent candidate cell notifying unit 123. Then, the handover information obtaining unit 131 sets, in the subsequent candidate cell, setting of preparation for handover using the UE context.

Figure 4:
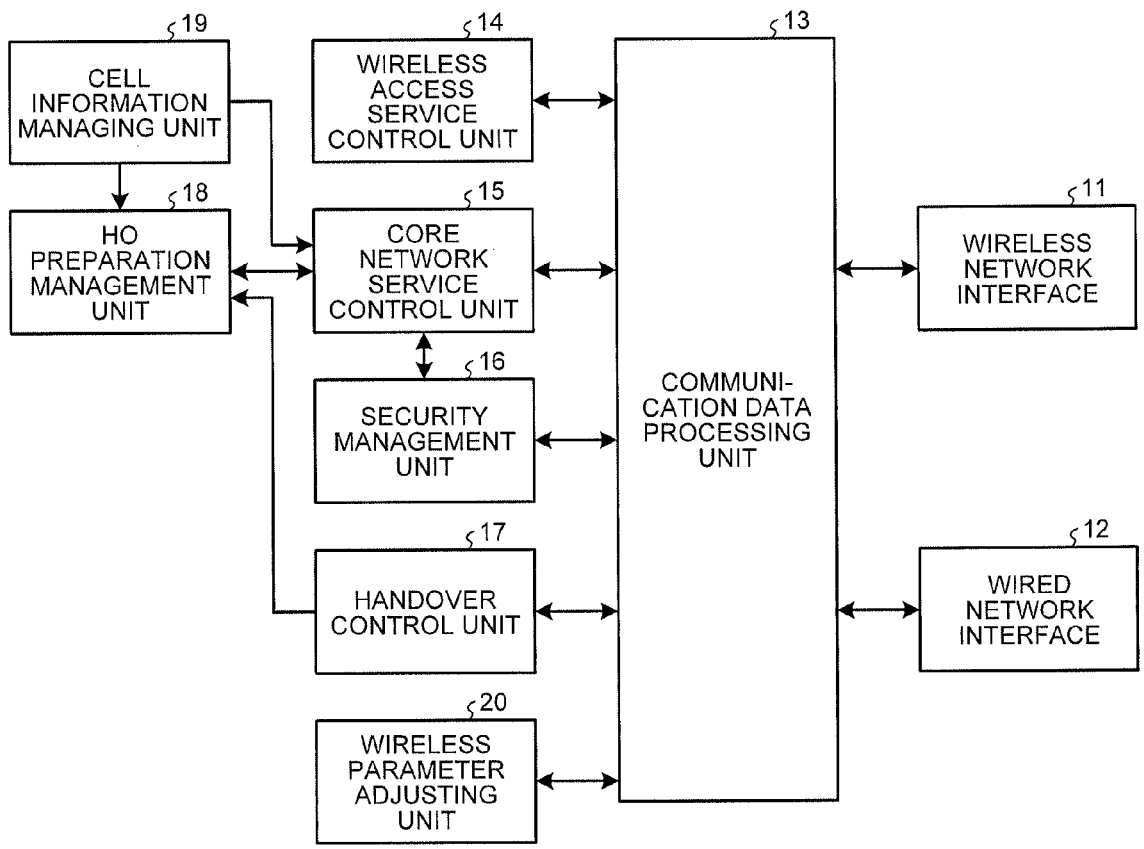
FIG. 4 is a block diagram illustrating overall configuration of eNB.

FIG. 4 is a block diagram illustrating overall configuration of eNB. FIG. 2 explained above extracts, from FIG. 4, and explains only the functions used for the explanation. Accordingly, in the explanation below, with reference to FIG. 4, overall explanation about each of the unit of the eNBs 101 to 104 and explanation about correspondence with each unit of FIG. 2 will be explained.

A wireless network interface 11 and a wired network interface 12 terminates L1/L2 protocols unique to the network interfaces, exchange data with other eNBs, and exchange data with a communication data processing unit 13.

The wireless network interface 11 transmits and receives data with the wireless communication terminal 3.

The wired network interface 12 transmits and receives data with other devices at the core network side such as other eNBs and the MMG/GW 2.

The communication data processing unit 13 performs processing concerning routing of data and data transfer protocol based on setting of a communication path (bearer). When input of communication data is received, the communication data processing unit 13 transmits communication data to another apparatus via the wireless network interface 11 and the wired network interface 12. Further, when the communication data processing unit 13 receives actual communication data, the communication data processing unit 13 outputs the communication data.

The communication data processing unit 13 recognizes signaling information and the like addressed to the apparatus in question such as the wireless access procedure message, and exchange data with each unit processing the signaling information. More specifically, the communication data processing unit 13 transmits the Measurement Report received from the wireless communication terminal 3 to a handover control unit 17. The communication data processing unit 13 outputs the received control signal at the core network side to the core network service control unit. More specifically, when an HO Request is received from another eNB, the communication data processing unit 13 transmits the received HO Request to a core network service control unit 15. Further, the communication data processing unit 13 receives an HO Request Acknowledge received from another eNB to the core network service control unit 15. The communication data processing unit 13 transmits an authentication Token received from a security management unit 16 and a request of setting of preparation for handover received from the core network service control unit 15 to an ENB designated by the core network service control unit 15.

A wireless access service control unit 14 terminates the control signaling with the wireless communication terminal, and performs, e.g., setting and release of a communication path in a wireless section.

The core network service control unit 15 terminates control signaling with the core network side, and performs, e.g., setting and release of a communication path in section other than the wireless section. The core network service control unit 15 transmits the HO Request received from the communication data processing unit 13 to an HO Preparation management unit 18. Further, the core network service control unit 15 transmits the HO Request Acknowledge received from the communication data processing unit 13 to the security management unit 16 and the HO Preparation management unit 18. The core network service control unit 15 transmits security key information included in the control signaling at the core network side to the security management unit 16. Further, the core network service control unit 15 receives notification of the target cell and subsequent candidate cell from the HO Preparation management unit 18. Then, the core network service control unit 15 obtains each cell information from a cell information managing unit 19. Then, the core network service control unit 15 transmits a HO Request which is a request for setting of preparation for handover using the UE context for each cell to the eNB accommodating each cell. Further, when the core network service control unit 15 receives the authentication Token and a request for setting of preparation for handover from another eNB, the core network service control unit 15 sets preparation for handover using the authentication Token for the designated cell.

When the core network service control unit 15 receives the information about the subsequent candidate cell from the HO Preparation management unit 18, the core network service control unit 15 transmits the information about the subsequent candidate cell to the eNB that has notified the target cell.

The security management unit 16 manages security key information included in the control signaling at the core network side. Then, the security management unit 16 generates key information used for each communication path using security key information managed therein. Then, the security management unit 16 transmits the key information for communication thus generated to the communication data processing unit 13.

The security management unit 16 uses the communication key information to generate, for each cell, authentication Token (Short-MAC-I) of reconnection message given to a wireless base station accommodating the subsequent candidate cell or the target cell in the HO Preparation procedure. The authentication Token includes information about the cell of another eNB which is to be the handover destination and information about the cell of the apparatus in question which is the origin of handover. In this case, this communication key information is applied only with the apparatus in question, and is information not given to even the eNB accommodating the cell of the target of the handover. More specifically, the authentication Token is generated only by the security management unit 16 of the apparatus in question. Therefore, for example, even when the eNB 102 extracts the subsequent candidate cell as a cell of target of handover for the eNB 101, the authentication Token given to the subsequent candidate cell is generated not by the eNB 102 but by the eNB 101.

The security management unit 16 generates key information given to another eNB during handover. Then, the security management unit 16 transmits the generated key information to the communication data processing unit 13.

The communication data processing unit 13, the core network service control unit 15, and the security management unit 16 have the functions of the target cell notifying unit 112, the subsequent candidate cell notifying unit 113, the subsequent candidate cell notifying unit 123, the handover information obtaining unit 121, and the handover information obtaining unit 131 of FIG. 2.

The cell information managing unit 19 holds and manages the cells accommodated in the apparatus in question and adjacent relationship representing absence/presence of control connection between cells accommodated in other base stations and these cells. This cell information managing unit 19 has the functions of the cell information managing unit 114 and the cell information managing unit 124 of FIG. 2.

The handover control unit 17 manages the Measurement Report transmission condition set in the wireless communication terminal 3. This transmission condition includes a threshold value of the communication quality and the like for transmitting the Measurement Report when the communication quality is less than the threshold value. The handover control unit 17 determines whether it is possible to perform handover based on the contents of the Measurement Report received from the wireless communication terminal 3. When the handover is determined to be possible, a command for extracting a target cell is notified to the HO Preparation management unit 18. This handover control unit 17 has some of the functions of the target cell extracting unit 111.

The HO Preparation management unit 18 uses the adjacent relationship held by the cell information managing unit 19 and the Measurement Report received by the handover control unit 17 to extract, as target cells, cells of which communication quality is equal to or more than a predetermined level. Then, the HO Preparation management unit 18 transmits a request for setting of preparation for handover for the target cell to the core network service control unit 15. The HO Preparation management unit 18 receives the information about the subsequent candidate cell from the core network service control unit 15. Then, the HO Preparation management unit 18 confirms the adjacent relationship of the subsequent candidate cell. Then, when the subsequent candidate cell is an adjacent cell, the HO Preparation management unit 18 transmits a request for setting of preparation for handover for the subsequent candidate cell to the core network service control unit 15.

The HO Preparation management unit 18 receives input of the information about the target cell transmitted by another eNB. Then, the HO Preparation management unit 18 determines whether the RLF incidence rate of the target cell received is equal to or more than the predetermined value. When it is more than the predetermined value, the HO Preparation management unit 18 obtains the adjacent cell of the target cell from the adjacent relationship held by the cell information managing unit 19. Then, the HO Preparation management unit 18 extracts, as subsequent candidate cells, adjacent cells which have received reconnection from the target cell and of which number of time of reconnections is equal to or more than the predetermined number. Then, the HO Preparation management unit 18 transmits the information about the subsequent candidate cell to the core network service control unit 15.

The handover control unit 17 and the HO Preparation management unit 18 have the functions of the target cell extracting unit 111 and the subsequent candidate cell extracting unit 122 of FIG. 2.

A wireless parameter adjusting unit 20 adjusts wireless control parameters such as power for optimization of communication performance and communication function in wireless communication.

Figure 5:
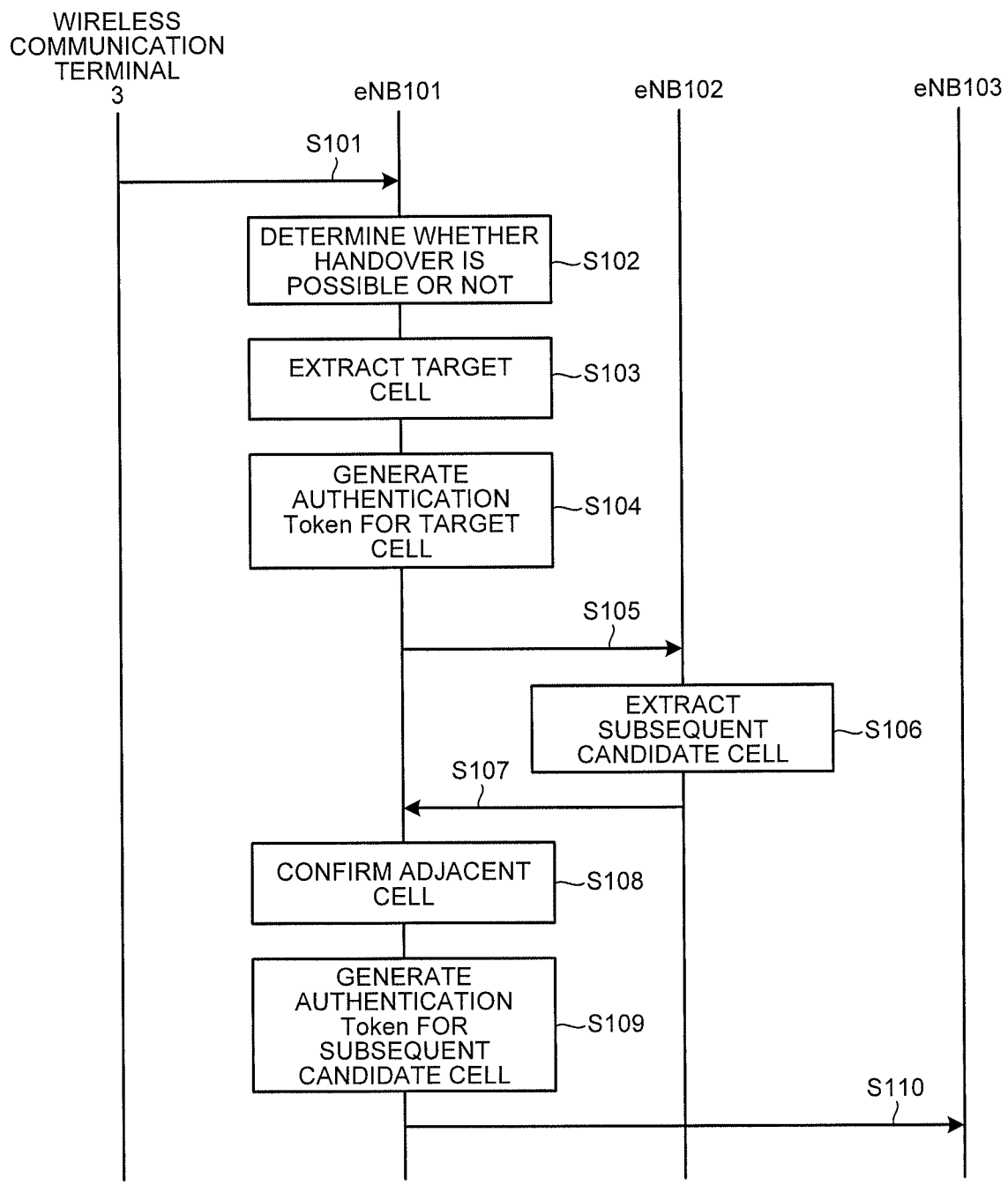
FIG. 5 is a sequence diagram illustrating processing of HO Preparation in a wireless communication system according to the first embodiment.

Subsequently, with reference to FIG. 5, processing of HO Preparation in the wireless communication system according to the present embodiment will be explained. FIG. 5 is a sequence diagram illustrating processing of HO Preparation in a wireless communication system according to the first embodiment. The vertical axis in the sequence diagram of FIG. 5 denotes elapse of time, in which the lower side indicates a later time. On the other hand, the vertical axis represents operation with each timing of the apparatus described above. An arrow connecting between the vertical axes denotes a flow of information between apparatuses which are indicated at the top of the vertical axes.

When the communication state satisfies the Measurement Report transmission condition, the wireless communication terminal 3 transmits the Measurement Report to the eNB 101 which is the current connection destination (step S101).

The target cell extracting unit 111 of the eNB 101 receives the Measurement Report and determines whether handover is possible or not (step S102). Then, when handover is possible, the target cell extracting unit 111 uses information about the communication quality of the Measurement Report and the cell information table to extract the target cell (step S103).

The target cell notifying unit 112 of the eNB 101 uses the information about the target cell extracted by the target cell extracting unit 111 to generate the authentication Token (step S104). Then, the target cell notifying unit 112 of the eNB 101 transmits the HO Request including the authentication Token to the eNB 102 (step S105).

The handover information obtaining unit 121 of the eNB 102 receives the HO Request from the eNB 101. Then, the handover information obtaining unit 121 of the eNB 102 makes setting of preparation for handover for the target cell. Then, the subsequent candidate cell extracting unit 122 of the eNB 102 uses the information about the target cell received from the handover information obtaining unit 121 to extract the subsequent candidate cell (step S106).

The subsequent candidate cell notifying unit 123 of the eNB 102 transmits the information about the subsequent candidate cell to the eNB 101 (step S107).

The subsequent candidate cell notifying unit 113 of the eNB 101 determines whether the subsequent candidate cell received using the cell information table is an adjacent cell or not (step S108). Then, when the subsequent candidate cell is an adjacent cell, the subsequent candidate cell notifying unit 113 of the eNB 101 generates an authentication Token for the subsequent candidate cell (step S109). Then, the subsequent candidate cell notifying unit 113 of the eNB 101 transmits the HO Request including the authentication Token to the eNB 103 (step S110). A handover information obtaining unit 141 of the eNB 103 sets preparation for handover for the cell designated as the subsequent candidate cell.

Figure 6:
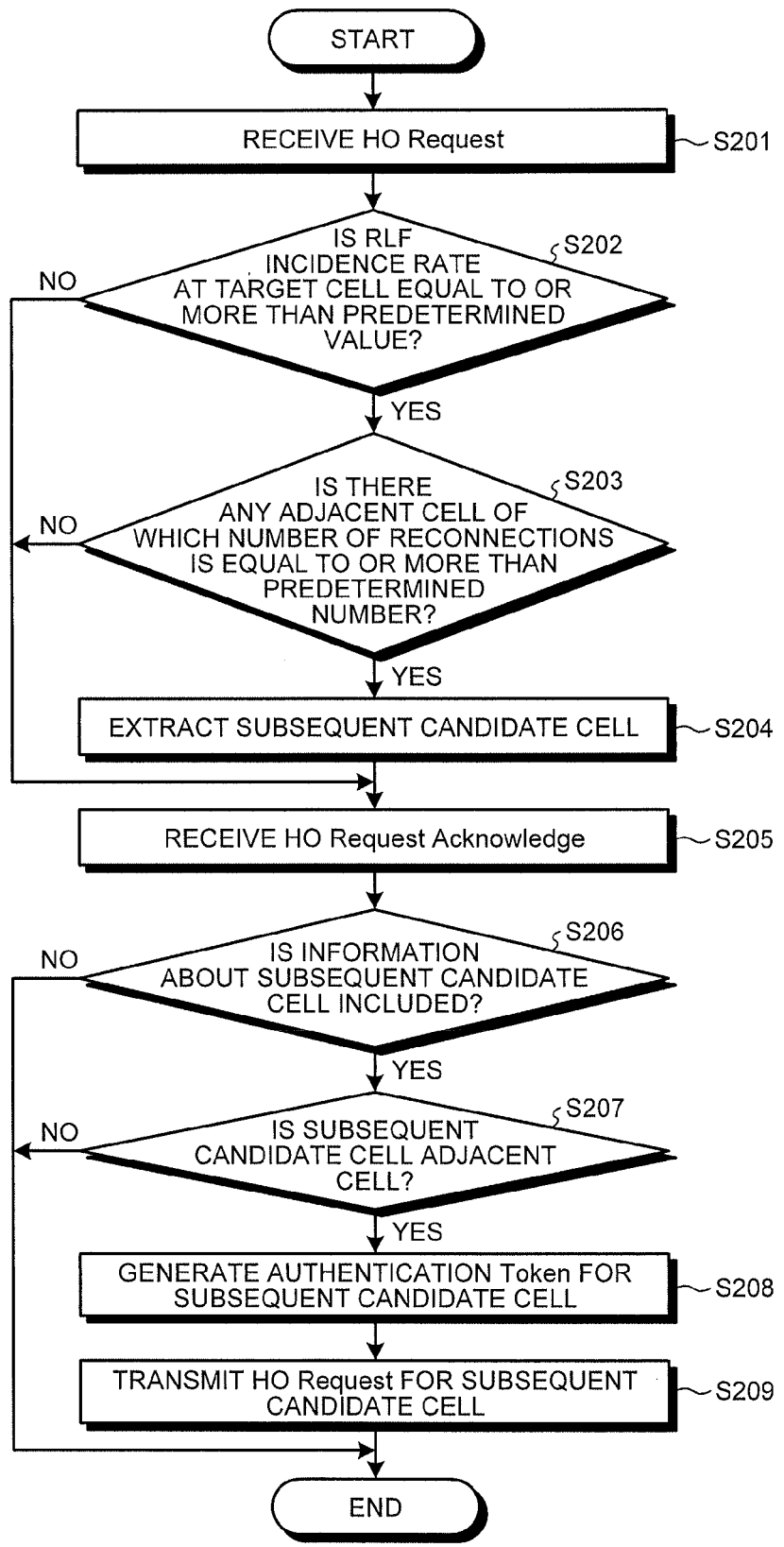
FIG. 6 is a flowchart illustrating processing of selection of a subsequent candidate cell and transmission of an HO Request to the subsequent candidate cell.

Further, with reference to FIG. 6, processing of selection of a subsequent candidate cell and transmission of an HO Request to the subsequent candidate cell will be explained. FIG. 6 is a flowchart illustrating processing of selection of a subsequent candidate cell and transmission of an HO Request to the subsequent candidate cell.

The handover information obtaining unit 121 of the eNB 102 receives an HO Request from the eNB 101 (step S201).

The subsequent candidate cell extracting unit 122 of the eNB 102 obtains the information of the target cell from the HO Request, and determines whether the RLF incidence rate in that target cell is equal to or more than the predetermined value (step S202). When it is more than the predetermined value (YES in step S202), the subsequent candidate cell extracting unit 122 of the eNB 102 determines whether, after the occurrence of the RLF, there is any adjacent cell of the target cell which receives a predetermined number of reconnections or more from the target cell (step S203). When there is an adjacent cell which receives a predetermined number of reconnections or more from the target cell (YES in step S203), the subsequent candidate cell extracting unit 122 of the eNB 102 extracts an adjacent cell where handover occurs for a predetermined number of times or more. Then, the subsequent candidate cell extracting unit 122 of the eNB 102 extracts, as subsequent candidate cell, a predetermined number of cells from the extracted cells in the descending order of the number of time of reconnections (step S204). Then, the subsequent candidate cell notifying unit 123 of the eNB 102 transmits an HO Request Acknowledge including the information about the subsequent candidate cell.

When the RLF incidence rate is less than the predetermined value in the target cell (NO in step S202), the subsequent candidate cell notifying unit 123 of the eNB 102 transmits an HO Request Acknowledge not including the information about the subsequent candidate cell. When there is no adjacent cell which receives a predetermined number of reconnections or more from the target cell (NO in step S203), the subsequent candidate cell notifying unit 123 of the eNB 102 transmits an HO Request Acknowledge not including the information about the subsequent candidate cell.

The subsequent candidate cell notifying unit 113 of the eNB 101 receives an HO Request Acknowledge (step S205).

The subsequent candidate cell notifying unit 113 of the eNB 101 determines whether the HO Request Acknowledge includes the information about the subsequent candidate cell or not (step S206). When included (YES in step S206), the subsequent candidate cell determines whether the subsequent candidate cell is an adjacent cell or not (step S207). When the subsequent candidate cell is an adjacent cell (YES in step S207), the subsequent candidate cell notifying unit 113 of the eNB 101 generates an authentication Token for the subsequent candidate cell (step S208). Then, the subsequent candidate cell notifying unit 113 of the eNB 101 transmits the HO Request including the authentication Token to the eNB 103 (step S209).

When the HO Request Acknowledge does not include the information about the subsequent candidate cell (NO in step S206), the eNB 101 terminates the processing without transmitting the HO Request for the subsequent candidate cell. When subsequent candidate cell is not an adjacent cell (NO in step S207), the eNB 101 terminates the processing without transmitting the HO Request for the subsequent candidate cell.

Figure 7:
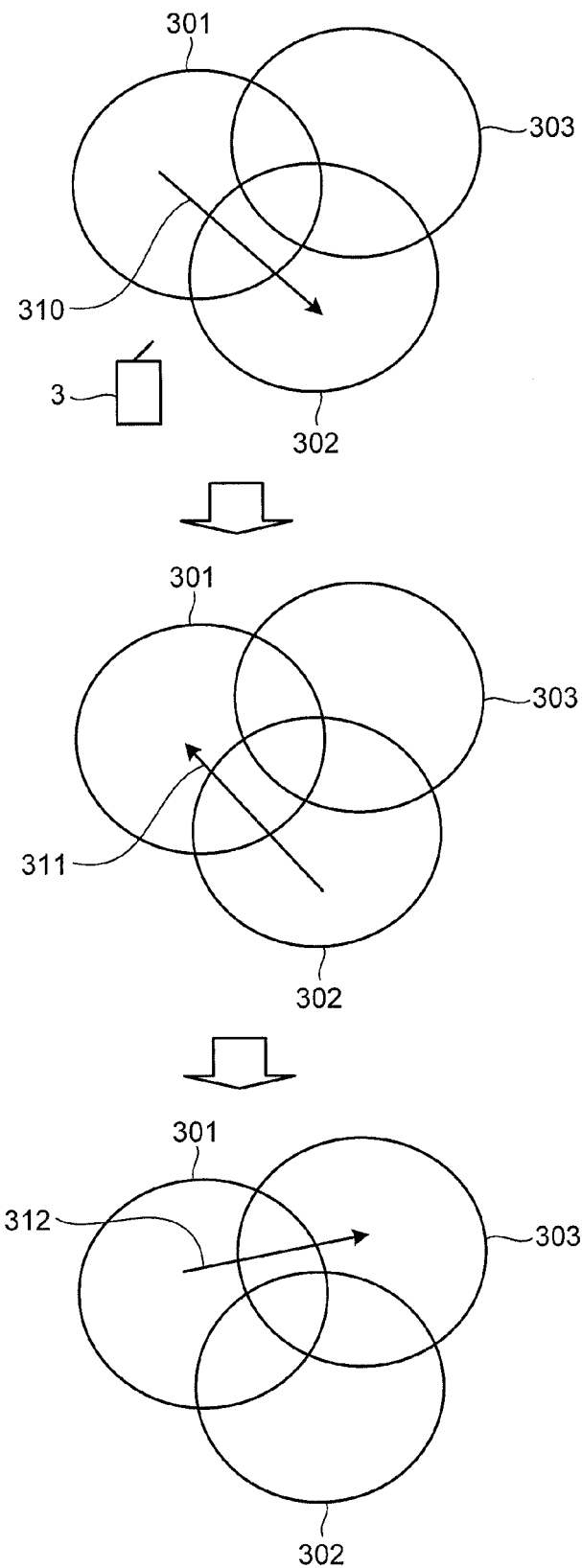
FIG. 7 is a figure for explaining overview of transmission processing of an HO Request according to the first embodiment.

Further, in order to easily understand overall operation of transmission of an HO Request according to the present embodiment, overview of transmission processing of the HO Request according to the present embodiment will be explained with reference to FIG. 7. FIG. 7 is a figure for explaining overview of transmission processing of an HO Request according to the first embodiment. In order to make the explanation easier, each cell directly exchanges information with other cells in the explanation below. In reality, however, the eNBs accommodating the cells exchange information with each other.

A cell 301 is a cell connected to the wireless communication terminal 3. First, the cell 301 receives a Measurement Report from the wireless communication terminal 3 and identifies a cell 302 as a target cell. Then, the cell 301 transmits an HO Request 310 to the cell 302.

Then, the cell 302 receives the HO Request 310, and makes setting of preparation for handover within the cell 302 itself. Further, the cell 302 identifies a cell 303 as the subsequent candidate cell from the adjacent cells adjacent to the cell 302. Then, the cell 302 transmits an HO Request Acknowledge 311 including information about 303 which is the subsequent candidate cell to the cell 301.

Then, the cell 301 receives the HO Request Acknowledge 311, and determines whether the cell 303 is an adjacent cell. In this case, the cell 303 is an adjacent cell of the cell 301. Accordingly, the cell 301 transmits a HO Request 312 to the cell 303.

The cell 303 receives the HO Request 312, and makes setting of preparation for handover within the cell 303 itself.

As explained above, the wireless communication system according to the present embodiment can select not only the cell selected as target of handover but also a cell of which chance of occurrence of reconnection is considered to be high, thus making it as target of handover preparation as a subsequent candidate. Thus, this can improve the chance that the cell expected to do handover makes preparation for the handover when handover is actually executed. Therefore, the wireless communication system according to the present embodiment achieves the effect of improving the chance of success of reconnection while reducing the load of processing during the handover.

With regard to this point, an example of conventional technique for improving the chance of reconnection includes a technique for making setting of preparation for handover not only with a cell extracted as a target of handover but also all adjacent cells which are adjacent to the cell in question at a step of preparation for handover. With this technique, however, every time handover occurs, the preparation for handover in all the adjacent cells is executed, and this generates heavy load due to, for example, generation of HO Requests therefor and signaling processing. In contrast, in the present embodiment, subsequent candidate cells are narrowed down and preparation for handover is done for them, and therefore, as compared with the conventional technique in which setting of preparation for handover is made for all the adjacent cells, the present embodiment can reduce the load during the handover.

Another example of technique for improving the chance of success of reconnection that occurs during handover or that occurs after the handover includes a technique for selecting multiple adjacent cells adjacent to a handover destination cell and adopts them as target cells. With this technique, however, it is impossible to find the communication state at the side of the wireless base station accommodating the target cell. Accordingly, depending on the communication state at the side of the wireless base station accommodating the target cell, reconnection may occur in a cell other than the cell designated as the target cell actually doing the handover. In this case, the handover fails. In contrast, in the present embodiment, the wireless base station accommodating the target cell extracts a subsequent candidate cell based on the communication state of the target cell, and therefore, the preparation for handover can be done in view of the communication state at the side of the wireless base station accommodating the target cell. Therefore, as compared with the conventional technique for selecting multiple target cells, the wireless communication apparatus according to the present embodiment can improve the chance of success of reconnection.

Second Embodiment

Figure 8:
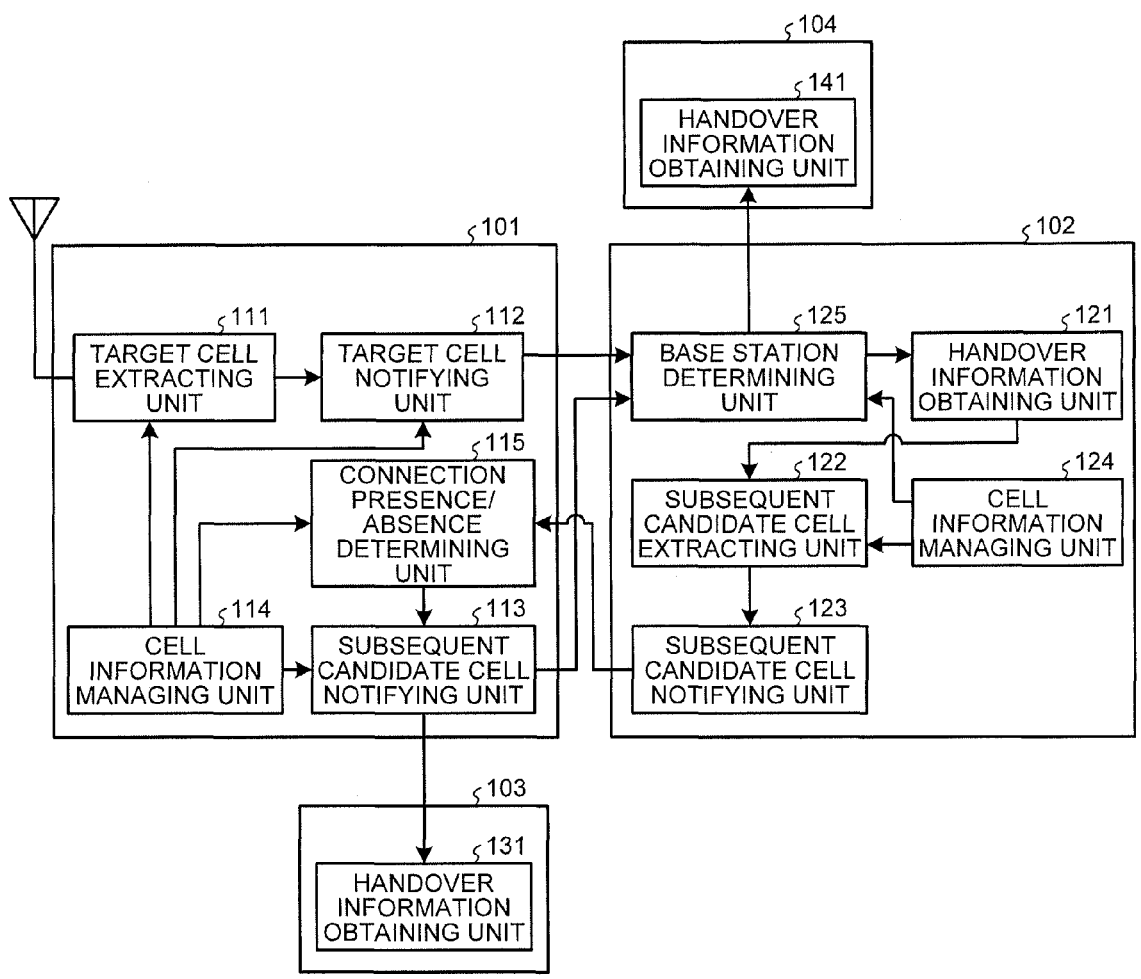
FIG. 8 is a block diagram illustrating a wireless base station according to a second embodiment.

FIG. 8 is a block diagram illustrating a wireless base station according to a second embodiment. The wireless communication system according to the present embodiment is different from the first embodiment in that when a subsequent candidate cell is not an adjacent cell, an eNB generating an HO Request requests an eNB extracting the subsequent candidate cell to do transfer to an eNB accommodating the subsequent candidate cell of the HO Request. Therefore, in the explanation below, transmission of the HO Request to the subsequent candidate cell in the eNB generating the HO Request will be mainly explained. Hereinafter, in FIG. 8, each portion denoted with the same reference numerals as that in FIG. 2 has the same function unless otherwise specified.

First, an eNB 101 will be explained. As illustrated in FIG. 8, the wireless communication system according to the present embodiment is configured such that a connection presence/absence determining unit 115 is added to the eNB 101 of the wireless communication system of the first embodiment.

A target cell notifying unit 112 transmits an HO Request for a target cell including an authentication Token for the target cell to a base station determining unit 125.

Figure 9:
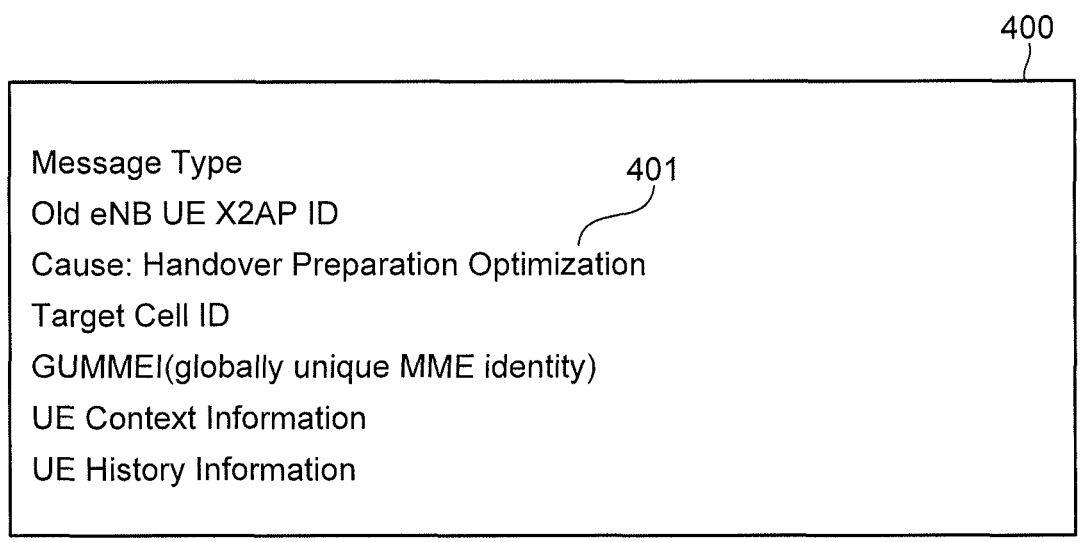
FIG. 9 is a figure illustrating an example of format of HO Request for making transfer request to a wireless base station accommodating a subsequent candidate cell.

In this case, FIG. 9 is a figure illustrating an example of format of HO Request for making transfer request to a wireless base station accommodating a subsequent candidate cell.

A format 400 includes not only the conventional HO Request format but also a Cause value 401 representing the information about the transfer destination. The target cell notifying unit 112 transmits the HO Request to an eNB accommodating the target cell. More specifically, since it is not necessary to transfer the HO Request, the target cell notifying unit 112 transmits the HO Request without setting the Cause value 401.

The connection presence/absence determining unit 115 receives the information about the subsequent candidate cell extracted by the subsequent candidate cell extracting unit 122 from the subsequent candidate cell notifying unit 123. Then, the connection presence/absence determining unit 115 uses the cell information table of the cell information managing unit 114 to determine whether the subsequent candidate cell is an adjacent cell, i.e., whether the subsequent candidate cell has a control connection with the apparatus in question. The connection presence/absence determining unit 115 transmits a determination result indicating whether the subsequent candidate cell is the adjacent cell or not to the subsequent candidate cell notifying unit 113.

The subsequent candidate cell notifying unit 113 receives the determination result from the connection presence/absence determining unit 115. Then, the subsequent candidate cell notifying unit 113 generates an authentication Token for the subsequent candidate cell.

When the subsequent candidate cell is the adjacent cell, the subsequent candidate cell notifying unit 113 transmits an HO Request for the subsequent candidate cell including the authentication Token to the wireless base station accommodating the subsequent candidate cell. In the present embodiment, the wireless base station accommodating the subsequent candidate cell which is the adjacent cell is the eNB 103, and in this case, the subsequent candidate cell notifying unit 113 transmits the HO Request to the eNB 103.

In contrast, when the subsequent candidate cell is not the adjacent cell, the subsequent candidate cell notifying unit 113 transmits a transfer request of transfer to a wireless base station accommodating the subsequent candidate cell as well as an HO Request for the subsequent candidate cell including the authentication Token to the eNB 102.

When transfer is requested, the subsequent candidate cell notifying unit 113 describes "Handover Preparation Optimization" as the Cause value 401. In contrast, when the eNB 102 is not requested to perform the transfer, i.e., when the subsequent candidate cell is accommodated in the eNB 102, the subsequent candidate cell notifying unit 113 does not set the Cause value 401. Then, the subsequent candidate cell notifying unit 113 transmits the HO Request to the eNB 102.

Subsequently, the eNB 102 will be explained. As illustrated in FIG. 8, the eNB 102 of the wireless communication system according to the present embodiment is obtained by adding a base station determining unit 125 to the eNB 102 of the wireless communication system of the first embodiment.

The base station determining unit 125 receives the HO Request from the target cell notifying unit 112 or the subsequent candidate cell notifying unit 113.

Then, the base station determining unit 125 confirms the Cause value 401 of the HO Request. When the Cause value 401 is blank, the base station determining unit 125 transmits the HO Request to the handover information obtaining unit 121.

In contrast, when the Cause value 401 is "Handover Preparation Optimization", the base station determining unit 125 identifies the wireless base station accommodating the subsequent candidate cell designated by the HO Request using the cell information table. Then, the base station determining unit 125 transmits the identified wireless base station to the HO Request. In the present embodiment, the eNB 104 is the wireless base station accommodating the subsequent candidate cell that is not the adjacent cell of the eNB 101. In this case, the base station determining unit 125 transmits the HO Request to the handover information obtaining unit 141 of the eNB 104.

In this case, when the eNB 104 also has the same function as the eNB 102, the base station determining unit 125 transmits the HO Request to the handover information obtaining unit 141 via the base station determining unit 125 of the eNB 104. In this case, the base station determining unit 125 sets the Cause value 401 of the HO Request as blank, and thereafter transmits the HO Request. This base station determining unit 125 corresponds to an "HO information transfer unit".

Figure 10:
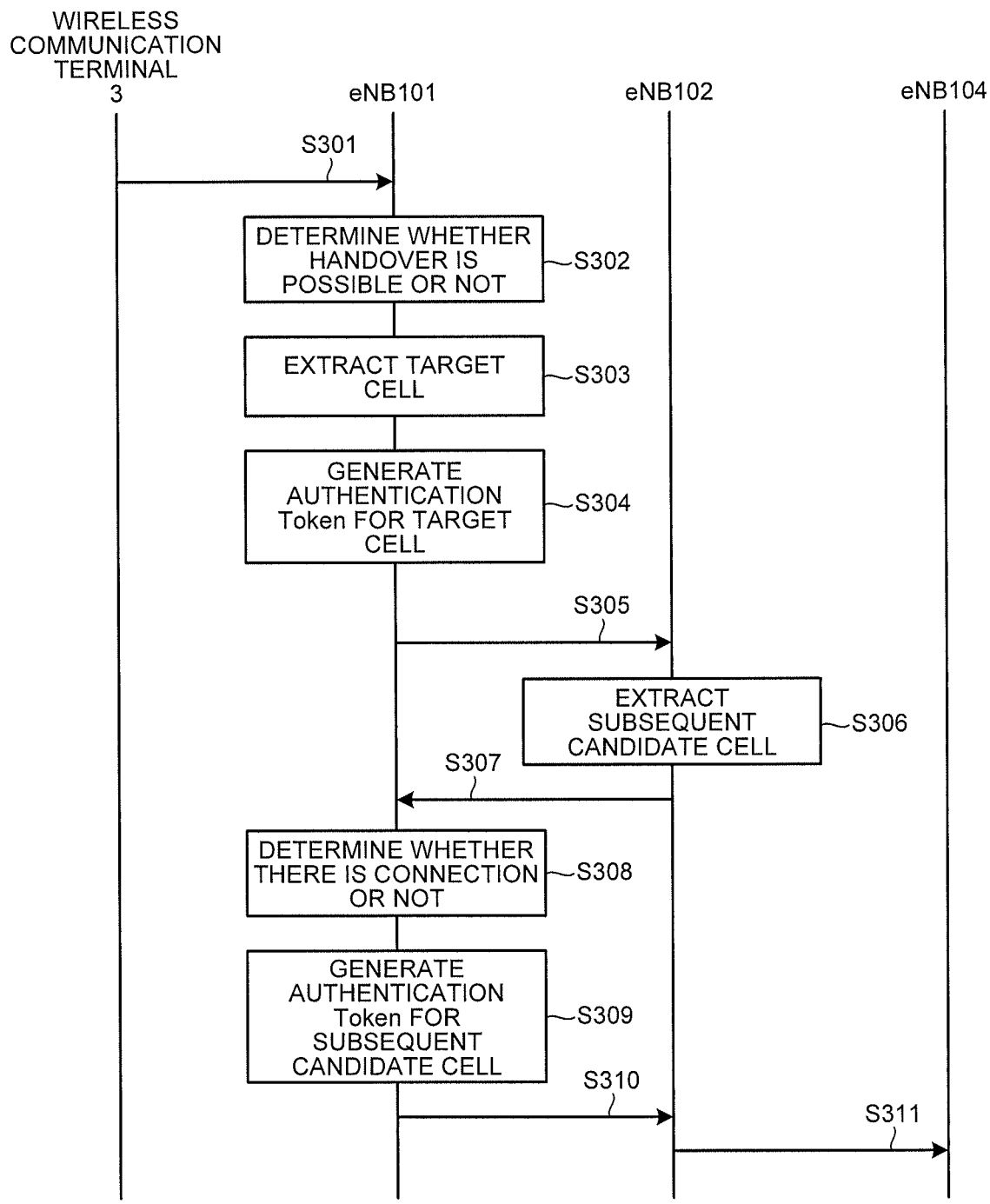
FIG. 10 is a sequence diagram of processing of HO Preparation in a wireless communication system according to the second embodiment.

Subsequently, with reference to FIG. 10, the processing of the HO Preparation in the wireless communication system according to the present embodiment will be explained. FIG. 10 is a sequence diagram of the processing of the HO Preparation in the wireless communication system according to the second embodiment.

When the communication state satisfies the Measurement Report transmission condition, the wireless communication terminal 3 transmits the Measurement Report to the eNB 101 which is the current connection destination (step S301).

The target cell extracting unit 111 of the eNB 101 receives the Measurement Report and determines whether handover is possible or not (step S302). Then, when handover is possible, the target cell extracting unit 111 uses information about the communication quality of the Measurement Report and the cell information table to extract the target cell (step S303).

The target cell notifying unit 112 of the eNB 101 uses the information about the target cell extracted by the target cell extracting unit 111 to generate the authentication Token (step S304). Then, the target cell notifying unit 112 of the eNB 101 transmits the HO Request including the authentication Token to the eNB 102 (step S305).

The handover information obtaining unit 121 of the eNB 102 receives the HO Request from the eNB 101. Then, the handover information obtaining unit 121 of the eNB 102 makes setting of preparation for handover for the target cell. Then, the subsequent candidate cell extracting unit 122 of the eNB 102 uses the information about the target cell received from the handover information obtaining unit 121 to extract the subsequent candidate cell (step S306).

The subsequent candidate cell notifying unit 123 of the eNB 102 transmits the information about the subsequent candidate cell to the eNB 101 (step S307).

The connection presence/absence determining unit 115 of the eNB 101 determines whether there is any control connection with the received subsequent candidate cell using the cell information table, i.e., whether there is any adjacent cell or not (step S308). Hereinafter, a case where there is no connection with the subsequent candidate cell will be explained. The connection presence/absence determining unit 115 of the eNB 101 notifies the subsequent candidate cell notifying unit 113 of the eNB 101 that the subsequent candidate cell is not an adjacent cell.

The subsequent candidate cell notifying unit 113 of the eNB 101 generates an authentication Token for the subsequent candidate cell (step S309). Then, the subsequent candidate cell notifying unit 113 of the eNB 101 transmits the HO Request including the authentication Token to the eNB 102 (step S310).

The base station determining unit 125 of the eNB 102 confirms the Couse value of the HO Request, and determines whether transfer is possible or not. Hereinafter, a case where transfer to the eNB 104 is performed will be explained. The base station determining unit 125 of the eNB 102 transmits the HO Request to the eNB 104 (step S311). The handover information obtaining unit 141 of the eNB 104 sets preparation for handover for the cell designated as the subsequent candidate cell.

Figure 11:
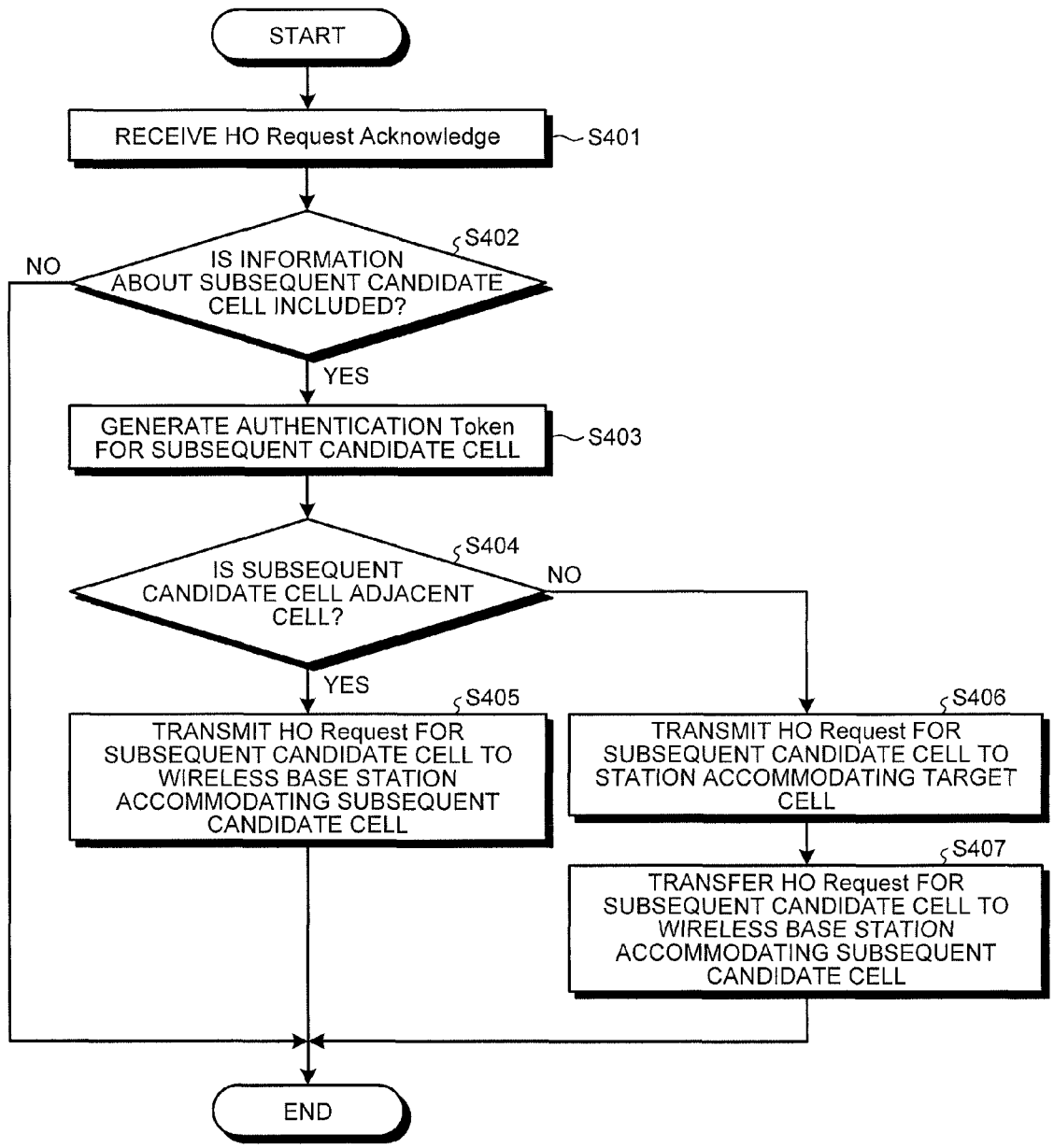
FIG. 11 is a flowchart illustrating processing of selection of a subsequent candidate cell and transmission of an HO Request to the subsequent candidate cell.

Further, with reference to FIG. 11, processing of selection of a subsequent candidate cell and transmission of an HO Request to the subsequent candidate cell will be explained. FIG. 11 is a flowchart illustrating processing of selection of a subsequent candidate cell and transmission of an HO Request to the subsequent candidate cell. In the processing of transmission of the HO Request according to the present embodiment, steps prior to processing of transmission of the HO Request to the subsequent candidate cell are the same as those in the processing of FIG. 6. Accordingly, in the flowchart of FIG. 11, the processing starts from the step for causing the eNB 101 to receive the HO Request Acknowledge from the eNB 102.

The subsequent candidate cell notifying unit 113 of the eNB 101 receives an HO Request Acknowledge (step S401).

The subsequent candidate cell notifying unit 113 of the eNB 101 determines whether the HO Request Acknowledge includes the information about the subsequent candidate cell or not (step S402). When included (YES in step S402), the subsequent candidate cell notifying unit 113 of the eNB 101 generates an authentication Token for the subsequent candidate cell (step S403).

Subsequently, the subsequent candidate cell notifying unit 113 of the eNB 101 determines whether the subsequent candidate cell is an adjacent cell or not (step S404). When the subsequent candidate cell is an adjacent cell (YES in step S404), the subsequent candidate cell notifying unit 113 of the eNB 101 transmits an HO Request for the subsequent candidate cell including the authentication Token to the eNB 103 which is the wireless base station accommodating the subsequent candidate cell (step S405).

In contrast, when the subsequent candidate cell is not an adjacent cell (NO in step S404), the subsequent candidate cell notifying unit 113 of the eNB 101 transmits an HO Request for the subsequent candidate cell including the authentication Token to the eNB 102 which is the wireless base station accommodating the target cell (step S406).

The eNB 102 confirms the Cause value of the HO Request, and transfers the HO Request to the eNB 104 which is the wireless base station accommodating the subsequent candidate cell (step S407).

When the HO Request Acknowledge does not include the information about the subsequent candidate cell (NO in step S402), the eNB 101 terminates the processing without transmitting the HO Request for the subsequent candidate cell.

Figure 12:
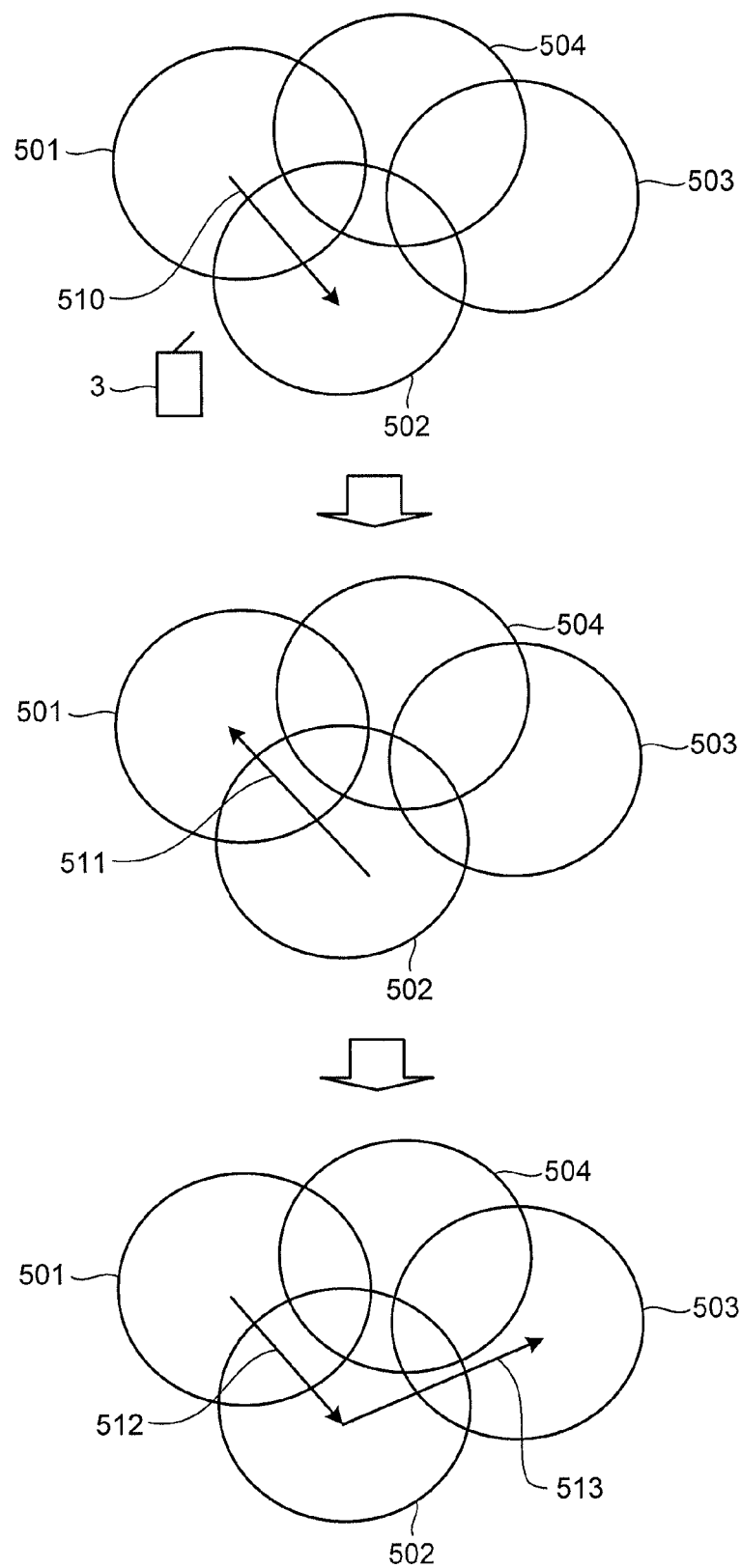
FIG. 12 is a figure for explaining overview of transmission processing of an HO Request according to the second embodiment.

Further, in order to easily understand overall operation of transmission of an HO Request according to the present embodiment, overview of transmission processing of the HO Request according to the present embodiment will be explained with reference to FIG. 12. FIG. 12 is a figure for explaining overview of transmission processing of an HO Request according to the second embodiment. In order to make the explanation easier, each cell directly exchanges information with other cells in the explanation below. In reality, however, the eNBs accommodating the cells exchange information with each other.

A cell 501 is a cell connected to the wireless communication terminal 3. The cell 501 is adjacent to a cell 502 and a cell 504, but the cell 501 is not adjacent to a cell 503. The cell 502 is accommodated in the eNB 102, and the cell 503 is accommodated in the eNB 104.

First, the cell 501 receives a Measurement Report from the wireless communication terminal 3 and identifies the cell 502 as a target cell. Then, the cell 501 transmits an HO Request 510 to the cell 502.

Then, the cell 502 receives the HO Request 510, and makes setting of preparation for handover within the cell 502 itself. Further, the cell 502 identifies the cell 503 as the subsequent candidate cell from the adjacent cells adjacent to the cell 502. Then, the cell 502 transmits an HO Request Acknowledge 511 including information about 503 which is the subsequent candidate cell to the cell 501.

Then, the cell 501 receives the HO Request Acknowledge 511, and determines whether the cell 503 is an adjacent cell. Then, since the cell 504 is not an adjacent cell, the cell 501 transmits an HO Request 512 including a transfer request to the cell 503 to the cell 502.

The cell 502 receives the HO Request 512, and confirms the transfer destination. Then, the cell 502 transmits an HO Request 513 from which the transfer request is deleted to the cell 503.

The cell 503 receives the HO Request 513, and makes setting of preparation for handover within the cell 503 itself.

As described above, even when a cell not having connection with a wireless base station which is the source of handover is selected as a subsequent candidate cell, the wireless communication system according to the present embodiment can transmit an HO Request via a wireless base station accommodating the target cell. Therefore, when reconnection may be made at a cell that is not directly recognized by the wireless base station which is the source of handover, the processing of the HO Preparation can be activated even for that cell. Thus, this can further improve the chance that the cell which is the target of reconnection actually makes preparation for the handover when handover is actually executed. Therefore, the wireless communication system according to the present embodiment achieves the effect of further improving the chance of success of reconnection while reducing the load of processing during the handover.

Third Embodiment

A wireless communication system according to a third embodiment is different from the first and second embodiments in the extraction condition of a subsequent candidate cell. Accordingly, in the explanation below, extraction of the subsequent candidate cell will be mainly explained. The wireless communication system according to the present embodiment also has each unit just like the first or second embodiment. In the explanation below, the extraction condition of the subsequent candidate cell of the first embodiment is changed, but the embodiment can be applied in the same manner when the extraction condition of the subsequent candidate cell of the second embodiment is changed. The wireless communication system according to the present embodiment is represented by the block diagram of FIG. 2. Hereinafter, each portion of FIG. 2 has the same function as the first embodiment unless otherwise specified.

The handover information obtaining unit 121 receives an HO Request from the eNB 101. Then, the handover information obtaining unit 121 outputs the information about the target cell designated by the HO Request to the subsequent candidate cell extracting unit 122.

The subsequent candidate cell extracting unit 122 of the eNB 102 according to the present embodiment stores, in advance, a predetermined time which is an upper limit value of a time elapsed since wireless parameter adjustment and a predetermined value which is an upper limit value of the number of times the reconnection occurs, which serve as threshold values for extraction of a subsequent candidate cell. The subsequent candidate cell extracting unit 122 stores predetermined pieces as the upper limit value of the number of subsequent candidate cells selected.

The subsequent candidate cell extracting unit 122 receives the information about the target cell from the handover information obtaining unit 121.

Then, the subsequent candidate cell extracting unit 122 determines whether the wireless parameter at the target cell satisfies any one of the following conditions: whether it is being adjusted or the elapsed time since the wireless parameter adjustment is within the predetermined time stored.

In this case, none of the above conditions is satisfied, the subsequent candidate cell extracting unit 122 transmits a notification indicating that there is no subsequent candidate cell to the subsequent candidate cell notifying unit 123.

In contrast, any one of the conditions is satisfied, the subsequent candidate cell extracting unit 122 determines whether the parameter to be adjusted is a counter adjacent cell unit setting or not. In this case, the counter adjacent cell unit setting means adjustment of the parameter that affects an adjacent cell other than the cell of which wireless parameter is adjusted when the wireless parameter is adjusted. In addition to the counter adjacent cell unit setting, there is a self-cell unit setting, which means adjustment of a parameter that affects only the cell of which wireless parameter is adjusted. When it is not the counter adjacent cell unit setting, a notification that there is no subsequent candidate cell is transmitted to the subsequent candidate cell notifying unit 123.

In contrast, in a case of the counter adjacent cell unit setting, the subsequent candidate cell extracting unit 122 determines whether there is any adjacent cell which has made reconnection due to occurrence of RLF in the target cell and of which number of time of reconnections is equal to or more than the predetermined number.

When there is no cell of which number of time of reconnections is equal to or more than the predetermined number, the subsequent candidate cell extracting unit 122 sends a notification indicating that there is no subsequent candidate cell to the subsequent candidate cell notifying unit 123.

In contrast, when there is a cell of which number of time of reconnections is equal to or more than the predetermined number, the subsequent candidate cell extracting unit 122 extracts, as subsequent candidate cells, a predetermined number of cells from these cells in the descending order of the number of time of reconnections. Then, the subsequent candidate cell extracting unit 122 transmits information about the extracted subsequent candidate cells to the subsequent candidate cell notifying unit 123.

Then, the subsequent candidate cell notifying unit 123 transmits an HO Request Acknowledge including the information about the subsequent candidate cell received from the subsequent candidate cell extracting unit 122 to the eNB 101.

Figure 13:
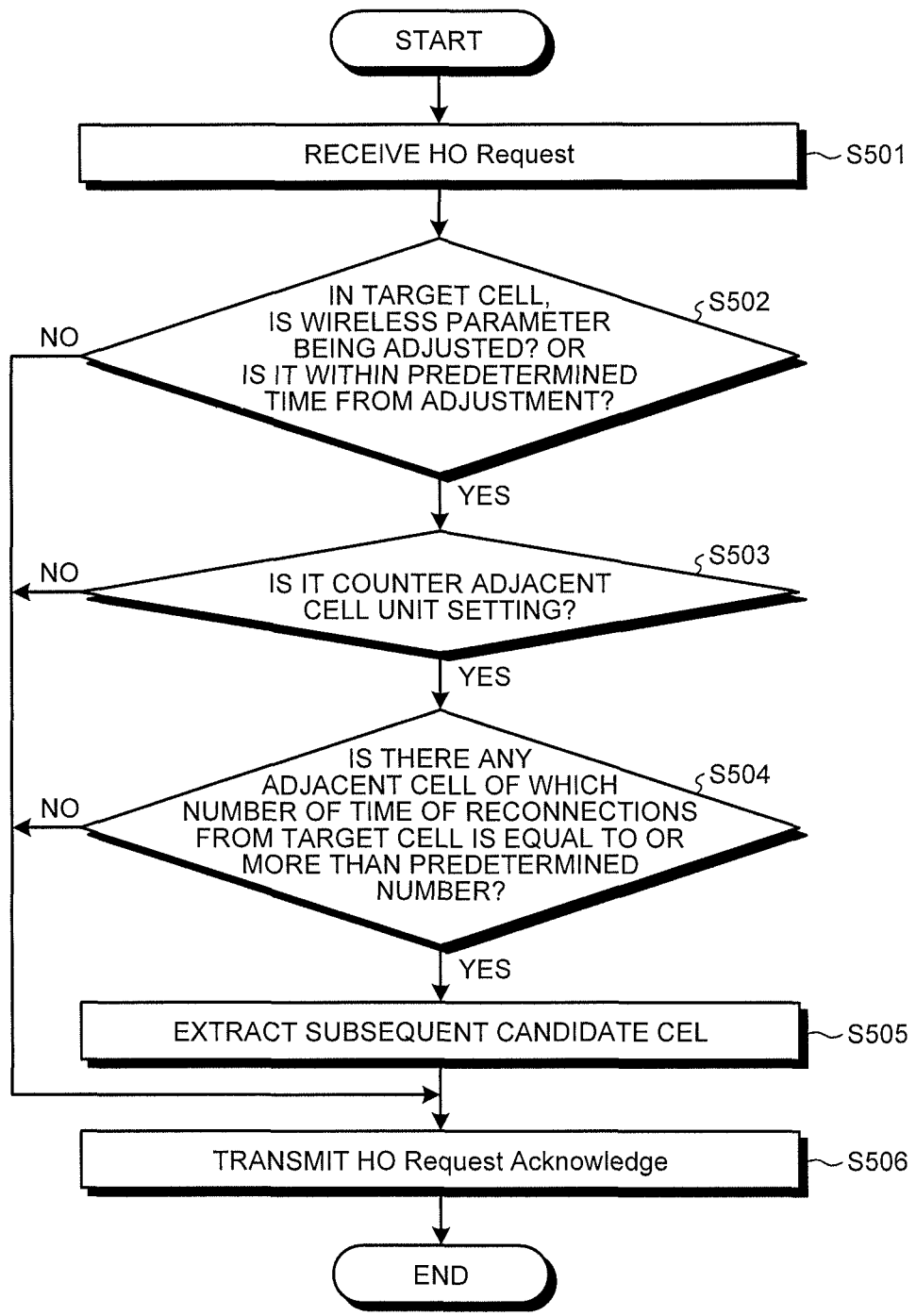
FIG. 13 is a flowchart illustrating extraction processing of a subsequent candidate cell of a wireless communication system according to a third embodiment.

Subsequently, extraction processing of the subsequent candidate cell in the eNB 102 will be explained with reference to FIG. 13. FIG. 13 is a flowchart illustrating extraction processing of a subsequent candidate cell of a wireless communication system according to the third embodiment.

First, the handover information obtaining unit 121 receives an HO Request from the eNB 101 (step S501). Then, the handover information obtaining unit 121 makes setting of preparation for handover for the target cell.

Subsequently, the subsequent candidate cell extracting unit 122 determines whether, in the target cell designated by the HO Request, the wireless parameter satisfies any one of the following conditions: whether it is being adjusted or the elapsed time since the wireless parameter adjustment is within the predetermined time (step S502). When any one of the conditions is satisfied (YES in step S502), the subsequent candidate cell extracting unit 122 determines whether the parameter to be adjusted is counter adjacent cell unit setting or not (step S503).

In a case of the counter adjacent cell unit setting (YES in step S503), the subsequent candidate cell extracting unit 122 determines whether there is any adjacent cell of which number of time of reconnections from the target cell is equal to or more than the predetermined number (step S504). When there is a cell of which number of time of reconnections is equal to or more than the predetermined number (YES in step S504), the subsequent candidate cell extracting unit 122 extracts, as subsequent candidate cells, a predetermined number of adjacent cells from the adjacent cells of which number of time of reconnections is equal to or more than the predetermined number in the descending order of the number of time of reconnections (step S505). Then, the subsequent candidate cell notifying unit 123 transmits an HO Request Acknowledge including the information about the subsequent candidate cell to the eNB 101 (step S506).

When none of the conditions is satisfied in step S502 (NO in step S502), the subsequent candidate cell notifying unit 123 transmits the HO Request Acknowledge without including the information about the subsequent candidate cell to the eNB 101 (step S506). When it is not the counter adjacent cell unit setting (NO in step S503), the HO Request Acknowledge not including the information about the subsequent candidate cell is transmitted to the eNB 101 (step S506). When there is no adjacent cell of which number of time of reconnections is equal to or more than the predetermined number (NO in step S504), the subsequent candidate cell notifying unit 123 also transmits the HO Request Acknowledge without including the information about the subsequent candidate cell to the eNB 101 (step S506).

Hereinafter, adjustment of the wireless parameter will be explained. For example, the wireless base station may adjust control parameters for an adjacent cell such as power control, handover control, random access control, and antenna angle adjustment in order to improve the performance and solve the phenomenon of problems. The power control is, for example, power control for the wireless communication terminal and eNB transmission. The handover control is, for example, Measurement condition setting for the wireless communication terminal. The random access control includes initial access power, the number of retransmissions, power increment amount control for each transmission.

In such case, depending on the precision and the degree of accuracy of adjustment method or adjustment of a wireless parameter, the connectivity to the adjacent cell may be deteriorated during adjustment or after the adjustment, and the handover preparation procedure may fail without completion. Even when the handover preparation procedure is successful, RLF may occur right immediately after that.

With regard to this issue, the following procedures are defined in the 3GPP standard as a procedure of information transmission between wireless base stations.

(1) RESOURCE STATUS REQUEST procedure for transmitting the load state.

(2) ENB CONFIGURATION REQUEST procedure for transmitting almost static configuration information such as the adjacent cell identifier of itself.

(3) MOBILITY CHANCE REQUEST procedure for transmitting a quality threshold value with which an eNB causes a wireless communication terminal to activate handover preparation, i.e., a threshold value for Measurement Report value. However, the procedure for transmitting the information about the wireless parameter is not defined. Therefore, it is difficult for the wireless base station accommodating the cell of the source of handover to recognize the information about the wireless parameters.

Hereinafter, a situation that occurs when these wireless parameters are adjusted will be explained. The HO control parameter includes parameters for controlling handover preparation determination transmitted between the wireless base stations by MOBILITY CHANGE REQUEST procedure and the Measurement Report of the wireless communication terminal which is the target of determination. The latter is a parameter with which the wireless communication terminal transmits the Measurement Report. More specifically, the parameter for controlling the Measurement Report of the wireless communication terminal is a value with which the wireless communication terminal measures the communication qualities of recognized cells including the connected cell and performs comparison with quality values of the connected cell and another cell and a compensation of the quality value of the connected cell itself. With this comparison, the wireless communication terminal determines Measurement Report transmission. Examples of values include a magnitude comparison threshold value, a difference comparison threshold value, an offset value of each cell, and a value in view of hysteresis for the connected cell.

Then, when the value in view of hysteresis and the offset value for the connected cell are reduced, other cells are more likely to be selected as candidates of handover target, and this increases the targets of handover. When these values are set excessively low and the difference comparison threshold value is too high as compared with them, there may be a situation where RLF is likely to occur while the Measurement Report is not transmitted. In this case, the handover may fail.

When there are a first cell and a second cell which are adjacent to a cell of the source of handover and which are adjacent to each other, the handover control parameter may be adjusted because of occurrence of RLF in the connected wireless communication terminal. In this case, the offset value of each cell for controlling the Measurement Report, the threshold value for determining activation of handover preparation for each of the cells of handover candidate, the antenna angle in view of the direction of a particular adjacent cell direction, or the like may be adjusted.

When such adjustments are made, handover may fail from the cell of the source of handover to the first cell or the second cell during the adjustment or after the adjustment, depending on the contents of adjustment, depending on the precision and the degree of accuracy of adjustment method or adjustment. Even if the handover succeeds, RLF may occur right after that. Such failure of handover depends on the contents of adjustment, and handover may occur to a cell different from the target cell.

More specifically, it can be said that handover may occur to a cell where a cell offset value and a handover activation determination threshold value are high and a cell where the coverage has been improved by the antenna angle adjustment.

With regard to this issue, the conventional technique does not allow the wireless base station accommodating the cell of the source of handover to find the control situation of the target cell and the situation between the target cell and adjacent cells thereto. For this reason, the wireless base station accommodating the cell of the source of handover does not activate backup handover preparation for helping reconnection so as to cope with unexpected circumstances due to the control of the wireless parameters in the target cell. When RLF occurs to cause handover to a cell other than the target cell under such situation, it is not accepted and therefore, the handover fails.

In contrast, the wireless communication system according to the present embodiment monitors the adjustment of the wireless parameters in the target cell and can find the control situation of the target cell and find the situation between the target cell and adjacent cells thereto. For this reason, the wireless base station accommodating the cell of the source of handover can activate backup handover preparation for helping reconnection so as to cope with unexpected circumstances due to the control of the wireless parameters in the target cell. Therefore, the chance of success of handover can be further improved.

Fourth Embodiment

A wireless communication system according to a fourth embodiment is configured such that the extraction condition of the subsequent candidate cell according to the third embodiment is narrowed down. The wireless communication system according to the present embodiment also has each unit just like the first or second embodiment. In the explanation below, the extraction condition of the subsequent candidate cell of the first embodiment is changed, but the embodiment can be applied in the same manner when the extraction condition of the subsequent candidate cell of the second embodiment is changed. The wireless communication system according to the present embodiment is represented by the block diagram of FIG. 2. Hereinafter, each portion of FIG. 2 has the same function as the first embodiment unless otherwise specified.

The handover information obtaining unit 121 receives an HO Request from the eNB 101. Then, the handover information obtaining unit 121 outputs the information about the target cell designated by the HO Request to the subsequent candidate cell extracting unit 122.

The subsequent candidate cell extracting unit 122 of the eNB 102 according to the present embodiment stores, in advance, a predetermined time which is an upper limit value of a time elapsed since wireless parameter adjustment and a predetermined value which is an upper limit value of the number of times the reconnection occurs, which serve as threshold values for extraction of a subsequent candidate cell. The subsequent candidate cell extracting unit 122 stores predetermined pieces as the upper limit value of the number of subsequent candidate cells selected.

The subsequent candidate cell extracting unit 122 receives the information about the target cell from the handover information obtaining unit 121.

Then, the subsequent candidate cell extracting unit 122 determines whether the wireless parameter at the target cell satisfies any one of the following conditions: whether it is being adjusted or the elapsed time since the wireless parameter adjustment is within the predetermined time stored.

In this case, none of the above conditions is satisfied, the subsequent candidate cell extracting unit 122 transmits a notification indicating that there is no subsequent candidate cell to the subsequent candidate cell notifying unit 123.

In contrast, any one of the conditions is satisfied, the subsequent candidate cell extracting unit 122 determines whether the parameter to be adjusted is a counter adjacent cell unit setting or not. In this case, the counter adjacent cell unit setting means adjustment of the parameter that affects an adjacent cell other than the cell of which wireless parameter is adjusted when the wireless parameter is adjusted. In addition to the counter adjacent cell unit setting, there is a self-unit setting, which means adjustment of a parameter that affects only the cell of which wireless parameter is adjusted. When it is not the counter adjacent cell unit setting, the subsequent candidate cell extracting unit 122 sends a notification that there is no subsequent candidate cell to the subsequent candidate cell notifying unit 123.

In contrast, in a case of the counter adjacent cell unit setting, the subsequent candidate cell extracting unit 122 determines whether the parameter of the adjustment target is a parameter unique to the adjacent cell such as control parameters with regard to, for example, power control, handover control, random access control, and antenna angle adjustment. More specifically, the power control is, for example, power control for the wireless communication terminal and eNB transmission. The handover control is, for example, Measurement condition setting for the wireless communication terminal. The random access control includes initial access power, the number of retransmissions, power increment amount control for each transmission. When the parameter of the adjustment target is not a parameter unique to the adjacent cell, the subsequent candidate cell extracting unit 122 sends a notification that there is no subsequent candidate cell to the subsequent candidate cell notifying unit 123.

In contrast, when the parameter of the adjustment target is a parameter unique to the adjacent cell, the subsequent candidate cell extracting unit 122 determines whether there is any adjacent cell which has made reconnection from the target cell and of which number of time of reconnections is equal to or more than the predetermined number.

When there is no cell of which number of time of reconnections is equal to or more than the predetermined number, the subsequent candidate cell extracting unit 122 sends a notification indicating that there is no subsequent candidate cell to the subsequent candidate cell notifying unit 123.

In contrast, when there is a cell of which number of time of reconnections is equal to or more than the predetermined number, the subsequent candidate cell extracting unit 122 extracts, as subsequent candidate cells, a predetermined number of cells from these cells in the descending order of the number of time of reconnections. Then, the subsequent candidate cell extracting unit 122 transmits information about the extracted subsequent candidate cells to the subsequent candidate cell notifying unit 123.

Then, the subsequent candidate cell notifying unit 123 transmits an HO Request Acknowledge including the information about the subsequent candidate cell received from the subsequent candidate cell extracting unit 122 to the eNB 101.

Figure 14:
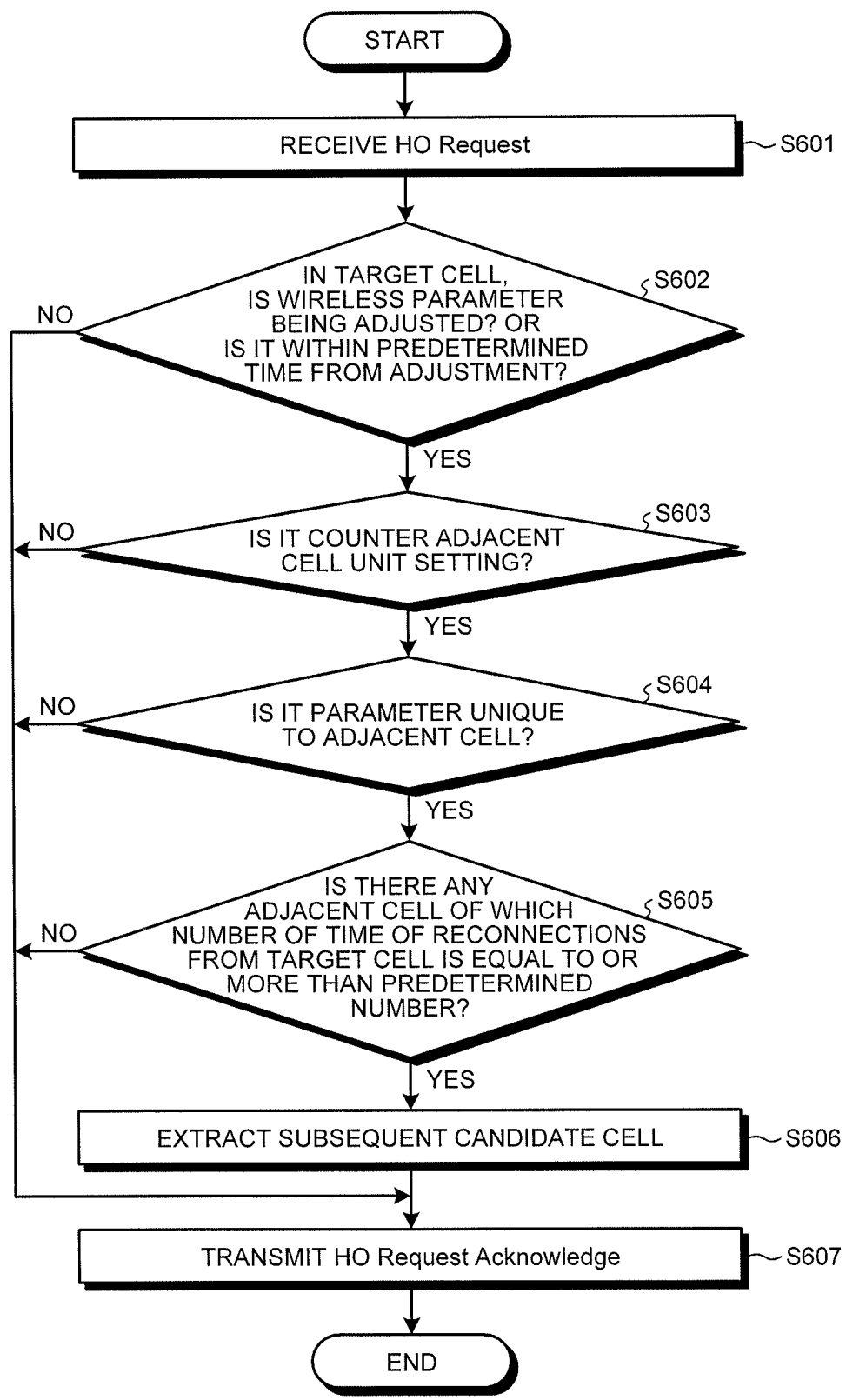
FIG. 14 is a flowchart illustrating extraction processing of a subsequent candidate cell of a wireless communication system according to a fourth embodiment.

Subsequently, extraction processing of the subsequent candidate cell in the eNB 102 will be explained with reference to FIG. 14. FIG. 14 is a flowchart illustrating extraction processing of the subsequent candidate cell of the wireless communication system according to the fourth embodiment.

First, the handover information obtaining unit 121 receives an HO Request from the eNB 101 (step S601). Then, the handover information obtaining unit 121 makes setting of preparation for handover for the target cell.

Subsequently, the subsequent candidate cell extracting unit 122 determines whether, in the target cell designated by the HO Request, the wireless parameter satisfies any one of the following conditions: whether it is being adjusted or the elapsed time since the wireless parameter adjustment is within the predetermined time (step S602). When any one of the conditions is satisfied (YES in step S602), the subsequent candidate cell extracting unit 122 determines whether the parameter to be adjusted is a counter adjacent cell unit setting or not (step S603).

In a case of the counter adjacent cell unit setting (YES in step S603), the subsequent candidate cell extracting unit 122 determines whether the parameter of the adjustment target is a parameter unique to the adjacent cell (step S604).

When the parameter of the adjustment target is a parameter unique to the adjacent cell (YES in step S604), the subsequent candidate cell extracting unit 122 determines whether there is any adjacent cell of which number of time of reconnections from the target cell is equal to or more than the predetermined number (step S605). When there is a cell of which number of time of reconnections is equal to or more than the predetermined number (YES in step S604), the subsequent candidate cell extracting unit 122 extracts, as subsequent candidate cells, a predetermined number of adjacent cells from the adjacent cells of which number of time of reconnections is equal to or more than the predetermined number in the descending order of the number of time of reconnections (step S606). Then, the subsequent candidate cell notifying unit 123 transmits an HO Request Acknowledge including the information about the subsequent candidate cell to the eNB 101 (step S607).

When none of the conditions is satisfied in step S602 (NO in step S602), the subsequent candidate cell notifying unit 123 transmits the HO Request Acknowledge without including the information about the subsequent candidate cell to the eNB 101 (step S607). When it is not the counter adjacent cell unit setting (NO in step S603), the HO Request Acknowledge not including the information about the subsequent candidate cell is transmitted to the eNB 101 (step S607). When the parameter of the adjustment target is not a parameter unique to the adjacent cell (NO in step S604), the subsequent candidate cell notifying unit 123 transmits the HO Request Acknowledge without including the information about the subsequent candidate cell to the eNB 101 (step S607). When there is no adjacent cell of which number of time of reconnections is equal to or more than the predetermined number (NO in step S605), the subsequent candidate cell notifying unit 123 also transmits the HO Request Acknowledge without including the information about the subsequent candidate cell to the eNB 101 (step S607).

As described above, the wireless communication system according to the present embodiment extracts the subsequent candidate cell only when the wireless parameter being adjusted is a parameter unique to the adjacent cell. Accordingly, only when handover to another cell is likely to occur due to adjustment of the wireless parameter or when handover is likely to occur again immediately after handover, the subsequent candidate cell can be extracted and the setting of preparation for handover can be made for the subsequent candidate cell. Therefore, processing to the subsequent candidate cell for helping reconnection can be reduced, and the load of processing during handover can be reduced.

Conventional techniques can be used in the above extraction of the target cell in each of the embodiments explained above. For example, in the extraction of the target cell, instead of extracting the cell of which communication quality is the highest, multiple cells that are not as good as the highest quality but are connectable are extracted as target cells, and using the Measurement Report, these cells may be notified to the eNB 101. In this case, the eNB 101 transmits the HO Requests to multiple target cells notified. In this case, the eNB 102 may select all of the received target cells or may select some of them and extract subsequent candidate cells for these cells, or the eNB 102 may extract a subsequent candidate cell only for the cell of the highest quality.

A wireless communication method, a wireless base station, and a wireless communication terminal disclosed by the present application, there is an advantage of improving the chance of success of reconnection with handover while reducing the load of processing during the handover.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communication system including a first wireless base station connected to a wireless communication terminal and a second wireless base station,
the first wireless base station comprising:
a first memory, and
a first processor coupled to the first memory,
wherein the first processor includes:
a target cell extracting unit that extracts a handover destination cell of the wireless communication terminal;
a target cell notifying unit that notifies first handover (HO) preparation information, which is information for handover of the wireless communication terminal including information about the handover destination cell, to the second wireless base station accommodating the handover destination cell; and
a subsequent candidate cell notifying unit that receives, from the second wireless base station, information about a subsequent candidate cell which is a candidate of handover destination other than the handover destination cell, and notifies second HO preparation information including the information about the subsequent candidate cell to a wireless base station accommodating the subsequent candidate cell,
the second wireless base station comprising:
a second memory, and
a second processor coupled to the second memory,
wherein the second processor includes:
a subsequent candidate cell extracting unit that obtains the information about the handover destination cell from the received first HO preparation information, and when an adjustment of a wireless parameter which comprises a power control, a handover control, a random access control, or an antenna angle adjustment for an adjacent cell is performed at the handover destination cell and when the wireless parameter at the handover destination cell satisfies either that the wireless parameter is being adjusted or that the elapsed time since the wireless parameter adjustment is within a predetermined time, extracts a specific cell as the subsequent candidate cell from among a plurality of first cells accommodated by the second wireless base station and a plurality of second cells accommodated by a wireless base station which has a control connection with the first cells, the specific cell receiving handover from the handover destination cell for a number of times equal to or more than a predetermined number of times; and
a subsequent candidate cell notifying unit that notifies the subsequent candidate cell to the first wireless base station.

2. The wireless communication system according to claim 1, wherein the first processor further includes a connection presence/absence determining unit that determines whether the subsequent candidate cell has connection with an apparatus in question,
when there is not connection with the subsequent candidate cell, the subsequent candidate cell notifying unit requests the second wireless base station to do transfer of the second HO preparation information to a third wireless base station accommodating the subsequent candidate cell, and
the second processor further includes an HO information transfer unit that receives the second HO preparation information and a request of transfer of the second HO preparation information, and transmits the second HO preparation information to the third wireless base station.

3. The wireless communication system according to claim 1, wherein when a radio link failure occurs with a predetermined rate or higher at a handover destination cell, the subsequent candidate cell extracting unit extracts, as a subsequent candidate cell, a cell which receives reconnection from the handover destination cell for a number of times equal to or more than a predetermined number of times.

4. The wireless communication system according to claim 1, wherein when the wireless parameter is a wireless parameter that affects another cell and is a parameter unique to an adjacent cell of the second wireless base station, the subsequent candidate cell extracting unit extracts the subsequent candidate cell.

5. A wireless base station comprising:
a memory, and
a processor coupled to the memory,
wherein the processor includes:
a target cell extracting unit that extracts a handover destination cell of a wireless communication terminal;
a target cell notifying unit that notifies first handover (HO) preparation information, which is information for handover of the wireless communication terminal including information about the handover destination cell, to another wireless base station accommodating the handover destination cell; and
a subsequent candidate cell notifying unit that receives, from the another wireless base station, information about a specific cell, the specific cell receiving handover from the handover destination cell designated for a number of times equal to or more than a predetermined number of times, being extracted from among a plurality of first cells accommodated by the second wireless base station and a plurality of second cells accommodated by a wireless base station which has a control connection with the first cells, when an adjustment of a wireless parameter which comprises a power control, a handover control, a random access control, or an antenna angle adjustment for an adjacent cell is performed at the handover destination cell and when the wireless parameter at the handover destination cell satisfies either that the wireless parameter is being adjusted or that the elapsed time since the wireless parameter adjustment is within the predetermined time, as the subsequent candidate cell, and notifies second HO preparation information including the information about the subsequent candidate cell to a wireless base station accommodating the subsequent candidate cell.

6. A wireless communication method for controlling a plurality of wireless base stations, the wireless communication method comprising:
causing a first wireless base station connected to a wireless communication terminal to extract a handover destination cell of the wireless communication terminal;
causing the first wireless base station to notify first handover (HO) preparation information, which is information for handover of the wireless communication terminal including information about the handover destination cell, to a second wireless base station accommodating the handover destination cell;
causing a second wireless base station to obtain the information about the handover destination cell from the first HO preparation information, and extract the subsequent candidate cell based on a state between the handover destination cell and another cell in wireless communication;
causing the second wireless base station to extract, when an adjustment of a wireless parameter which comprises a power control, a handover control, a random access control, or an antenna angle adjustment for an adjacent cell is performed at the handover destination cell and when the wireless parameter at the handover destination cell satisfies either that the wireless parameter is being adjusted or that the elapsed time since the wireless parameter adjustment is within the predetermined time, a specific cell as a subsequent candidate cell from a plurality of first cells accommodated by the second wireless base station and a plurality of second cells accommodated by a wireless base station which has a control connection with the first cells, the specific cell receiving handover from the handover destination cell for a number of times equal to or more than a predetermined number of times, the subsequent candidate cell being a candidate of handover destination other than the handover destination cell;
causing the first wireless base station to receive information about the subsequent candidate cell transmitted from the second wireless base station; and
causing the first wireless base station to notify second HO preparation information including the information about the subsequent candidate cell to a wireless base station accommodating the subsequent candidate cell.

7. A wireless communication terminal comprising:
a memory, and
a processor coupled to the memory,
wherein the processor includes:
a connection unit that connects by wireless communication with a first wireless base station including a target cell extracting unit for extracting a handover destination cell of a connected wireless communication terminal, a target cell notifying unit for notifying first handover (HO) preparation information, which is information for handover of the wireless communication terminal including information about the handover destination cell, to a second wireless base station accommodating the handover destination cell, and a subsequent candidate cell notifying unit that receives, from the second wireless base station, information about a subsequent candidate cell which is a candidate of handover destination other than the handover destination cell, and notifies second HO preparation information including the information about the subsequent candidate cell to a wireless base station accommodating the subsequent candidate cell; and
a handover control unit that performs handover for a specific cell, the specific cell receiving handover from the handover destination cell designated by the first HO preparation information for a number of times equal to or more than a predetermined number of times, being extracted from a plurality of first cells accommodated by the second wireless base station and a plurality of second cells accommodated by a wireless base station which has a control connection with the first cells, when an adjustment of a wireless parameter which comprises a power control, a handover control, a random access control, or an antenna angle adjustment for an adjacent cell is performed at the handover destination cell and when the wireless parameter at the handover destination cell satisfies either that the wireless parameter is being adjusted or that the elapsed time since the wireless parameter adjustment is within the predetermined time, as the subsequent candidate cell by the second wireless base station and being notified to the first wireless base station.

* * * * *